(12) United States Patent
Dietz et al.

(10) Patent No.: US 11,691,140 B2
(45) Date of Patent: Jul. 4, 2023

(54) METHOD FOR THE PREPARATION OF CONTROLLED POROSITY SUPPORTS FOR CHROMATOGRAPHIC SEPARATION

(71) Applicant: UWM Research Foundation, Inc., Milwaukee, WI (US)

(72) Inventors: Mark Dietz, Niles, IL (US); Abdul Momen, Westmont, IL (US); Charles Smith, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 299 days.

(21) Appl. No.: 17/079,280

(22) Filed: Oct. 23, 2020

(65) Prior Publication Data

US 2021/0121866 A1 Apr. 29, 2021

Related U.S. Application Data

(60) Provisional application No. 62/925,753, filed on Oct. 24, 2019.

(51) Int. Cl.
| | | |
|---|---|---|
| *B01D 15/20* | (2006.01) | |
| *B01D 15/36* | (2006.01) | |
| *B01D 15/42* | (2006.01) | |
| *B01J 39/05* | (2017.01) | |
| *B01J 39/16* | (2017.01) | |
| *B01J 47/02* | (2017.01) | |
| *B01J 47/018* | (2017.01) | |

(52) U.S. Cl.
CPC .......... *B01J 39/05* (2017.01); *B01D 15/206* (2013.01); *B01D 15/362* (2013.01); *B01D 15/426* (2013.01); *B01J 39/16* (2013.01); *B01J 47/018* (2017.01); *B01J 47/02* (2013.01)

(58) Field of Classification Search
CPC . B01J 39/05; B01J 39/19; B01J 47/018; B01J 47/02; B01D 15/206; B01D 15/362; B01D 15/426
See application file for complete search history.

(56) References Cited

U.S. PATENT DOCUMENTS

| | | |
|---|---|---|
| 3,505,785 A | 4/1970 | Kirkland |
| 4,070,283 A | 1/1978 | Kirkland |
| 4,245,005 A | 1/1981 | Regnier et al. |
| 4,477,492 A | 10/1984 | Bergna et al. |

OTHER PUBLICATIONS

Alexandratos et al., (1998). Synthesis and characterization of high-stability solvent-impregnated resins. Ind. Eng. Chem. Res., 37, 4756-4760.

Alvarez, "A Cartography of the van der Waals Territories," Dalton Trans. 2013, 42, 8617-8636.

Ansari et al., "A review on solid phase extraction of actinides and lanthanides with amide based extractants," Journal of Chromatography A, 2017, 1499, 1-20.

(Continued)

*Primary Examiner* — Benjamin L Lebron
(74) *Attorney, Agent, or Firm* — Michael Best & Friedrich LLP

(57) ABSTRACT

Disclosed herein are extraction chromatographic supports comprising a porous support, an inert filler, and metal ion binding extractant that may be used for chromatographic separation of metal ions. Also disclosed herein are methods for preparing and using the extraction chromatographic supports.

20 Claims, 31 Drawing Sheets

(56) References Cited

OTHER PUBLICATIONS

Ansari et al., "Evaluation of an extraction chromatographic resin containing CMPO and ionic liquid for actinide ion uptake from acidic feeds: Part II. Batch actinide sorption, radiolytic degradation and column studies," 2014, Radiochimica Acta, 102, 589-597.

Arias et al., "Cadmium(II) recovery from hydrochloric acid solutions using Amberlite XAD-7 impregnated with a tetraalkyl phosphonium ionic liquid," 2011, Reactive and Functional Polymers, 71, 1059-1070.

Aydin et al., "Polymer-filled composite porous catalytic particles for hydrodynamic studies in tricklebed reactors", Ind. Eng. Chem. Res. 47, 2569-2578 (2008).

Badei et al., "Extraction chromatographic performance of uranium using XAD-4 loaded with di-2-ethylhexylphosphoric acid and nitrate solution," Isotopenpraxis, 25, 211-214, (1989).

Bao et al., "Recovery and separation of metal ions from aqueous solutions by solvent-impregnated resins," 2016 Chem. Eng. Technol. 39 1377-1392.

Bertelsen et al., "Microcolumn lanthanide separation using bis(2-ethylhexyl) phosphoric acid functionalized ordered mesoporous carbon materials," Journal of Chromatography A, 1595, 248-256, 2019.

Bhattacharyya et al., "Extraction chromatographic study on the separation of Am3+ and Eu3+ using ethyl-BTP as the extractant. Journal of Radioanalytical and Nuclear Chemistry," 2011, 288, 571-577.

Bhatti et al., "Evaluation of chromium (VI) sorption efficiency of modified Amberlite XAD-4 resin," Arab. J. Chem. 10, (2017) S1111-S1118.

Cerrai et al., "Separation of rare earths by column chromatography with cellulose powder treated with di(2-ethylhexyl)orthophosphoric acid-Part 2," Energia Nucleate, 9, 377-384, 1962.

Chen et al., "Synthesis and optimization of wide pore superficially porous particles by a one-step coating process for the separation of proteins and monoclonal antibodies", J. Chrom. A 1414, 147-157 (2015).

Choi et al., "Controlled polymerization in mesoporous silica toward the design of organic-inorganic composite nanoporous materials", J. Am. Chem. Soc. 127, 1924-1932 (2005).

Cocalia et al., "Identical extraction behavior and coordination of trivalent or hexavalent f-element cations using ionic liquid and molecular solvents," 2005, Dalton Transactions, 11, 1966-1971.

Deetlefs et al., "Improved preparations of ionic liquids using microwave Irradiation," 2003. Green Chem., 5, 181-186.

Dietz, "Recent progress in the development of extraction chromatographic methods for radionuclide separation and preconcentration", In Radioanalytical methods in interdisciplinary research: American Chemical Society, Washington, DC, 2003, p. 161-176.

Dietz et al., "Novel chromatographic materials based on nuclear waste processing chemistry", LC*GC 11, 424-436 (1993).

Dietz et al., "Extraction Chromatography: Progress and Opportunities", in Metal Ion Separation and Preconcentration, American Chemical Society, Washington, DC, 1999, pp. 234-250.

Domínguez et al., "Removal of common pharmaceuticals present in surface waters by Amberlite XAD-7 acrylic-ester-resin: Influence of pH and presence of other drug," Desalination 269, (2011) 231-238.

Drader et al., "Assessment of monoamide extractants and solid supports as new extraction chromatographic materials," Sep. Purif. Technol., 2016, 163, 352-356.

Eschrich, "Separation of Neptunium (IV), neptunium (V), neptunium (VI) by extraction chromatography," Fresenius' Zeitschrift Fur Analytische Chemie, 226, 100-114, (1967).

Fredlake et al., "Thermophysical properties of imidazolium-based ionic liquids," 2004. J. Chem. Eng. Data, 49, 954-964.

Garvey et al., "Effect of Aqueous Phase Anion on the Mode of Facilitated Ion Transfer into Roomtemperature Ionic Liquids", Talanta 95, 25-30 (2012).

Garvey, et al., "Ionic Liquid Anion Effects in the Extraction of Metal Ions by Macrocyclic Polyethers", Sep. Purif. Technol. 123, 145-152 (2014).

Gharibyan et al., "Extraction behavior of americium and curium on selected extraction chromatography resins from pure acidic matrices," 2014, Solvent Extraction and Ion Exchange, 32, 391-407.

Grosse-Ruyken et al., (1964). "Partition chromatography of rare earths with bis(2-ethylhexyl)phosphoric acid. I. Effect of working conditions on the separation performance of the column," 1964, J. Prakt. Chem., 4, 79-87.

Gujar et al., "Spectacular enhancements in actinide ion uptake using novel extraction chromatography resins containing TODGA and ionic liquid," 2015, Separation and Purification Technology, 141, 229-234.

Halasz et al., "Micro beads coated with a porous thin layer as column packing in gas chromatography", Anal. Chem. 36, 1178-1186 (1964).

Halasz et al., "Porous layer glass bead column packing in gas adsorption layer chromatography", Anal. Chem. 36, 2226-2229 (1964).

Harada et al., "Preparation of Macroporous cellulose beads through a single-step non-solvent induced phase separation method from a cellulose acetate solution," Bull. Chem. Soc. Jpn. 92 (2019) 1444-1446.

Hawkins et al., "Rapid Quantification of Imidazolium-based Ionic Liquids by Hydrophilic Interaction Liquid Chromatography: Methodology and an Investigation of the Retention Mechanisms", J. Chrom. A 1400, 54-64 (2015).

Hawkins et al., "Evaluation of Hydroxyalkyl-functionalized Imidazolium Ionic Liquids as Solvents for the Extraction of Metal Ions", Sep. Sci. Technol. 47, 1993-2001 (2012).

Hawkins et al., "Evaluation of Solid-Supported Room-temperature Ionic Liquids Containing Crown Ethers as Media for Metal Ion Separation and Preconcentration", Talanta 135, 115-123 (2015).

Hawkins et al., "Application of ionic liquids in the preparation of extraction chromatographic materials for metal ion separations: Progress and prospects," Sep. Sci. Technol. 53 1820-1833, (2018).

Hawkins et al., "Structural Variations in Room-Temperature Ionic Liquids: Influence on Metal Ion Partitioning Modes and Extraction Selectivity", Sep. Purif. Technol. 89, 31-38 (2012).

Heinze et al., "Solid-ionic liquid interfaces: Pore filling revisited. Physical Chemistry Chemical Physics," 16, 24359-24372, (2014).

Herrmann, "Contribution to the separation of rare earths by extraction chromatography with di(2-ethylhexyl)phosphoric acid (Hdehp)," I. Silica gel as a support material for the stationary phase. J. Chromatogr., 38, 498-507, (1968).

Horvath, C.G. et al., "Fast liquid chromatography. Investigation of operating parameters and the separation of nucleotides on pellicular ion exchangers", Anal. Chem. 39, 1422-1428 (1967).

Horwitz, E.P. et al., "High-speed radiochemical separations by liquid-liquid chromatography using a CSP support. I. Performance of quaternary ammonium chloride-Zipax system for the elution of Cd(II) with HCl", J. Chrom. Sci. 12, 11-22 (1974).

Horwitz, E.P. et al., "High-speed radiochemical separations by liquid-liquid chromatography using a CSP support. II. Separation of metal ions using tricaprylmethylammonim chloride on Zipax", J. Chrom. Sci. 12, 200-205 (1974).

Horwitz, E.P. et al., "Extraction chromatography of californium, einsteinium, and fermium with di(2-ethylhexyl)orthophosphoric acid," J. Inorg. Nucl. Chem., 31, 1149-1166, (1969).

Horwitz, E.P. et al., "Preparation, performance, and factors affecting band spreading of high efficiency extraction chromatographic cols. for actinide separations," J. Inorg. Nucl. Chem., 34, 3851-3871, (1972).

Horwitz, E.P. et al., "Extraction chromatography versus solvent extraction: How similar are they?" Sep. Sci. Technol., 41, 2163-2182, (2006).

Horwitz, E.P., et al., "Novel extraction of chromatographic resins based on tetraalkyldiglycolamides: Characterization and potential applications. Solvent Extraction and Ion Exchange," 23, 319-344, (2005).

(56) References Cited

OTHER PUBLICATIONS

Horwitz, E.P.; et al., "Separation and preconcentration of uranium from acidic media by extraction chromatography," Analytica Chimica Acta, 266, 25-37, 1992.
Horwitz, E.P.; et al., "DIPEX: A New Extraction Chromatographic Material for the Separation and Preconcentration of Actinides from Aqueous Solution", React. Funct. Polym. 33, 25-36 (1997).
Horwitz, E.P. et al., "The separation of americium and curium by extraction chromatography using molecular weight quaternary ammonium nitrate," Inorganic and Nuclear Chemistry Letters, 2, 87-91, (1966).
Horwitz, E.P. et al., "Separation and preconcentration of strontium from biological, environmental, and nuclear waste samples by extraction chromatography using a crown ether," Anal. Chem., 63, 522-525, (1991).
Horwitz, E.P. et al., "A lead-selective extraction chromatographic resin and its application to the isolation of lead from geological samples," Anal. Chim. Acta., 292, 263-273, (1994).
Horwitz, E.P. et al., "Separation and preconcentration of actinides by extraction chromatography using a supported liquid anion exchanger: Application to the characterization of high-level nuclear waste solutions," Anal. Chim. Acta., 310, 63-78, (1995).
Horwitz, E.P., et al., "Concentration and separation of actinides from urine using a supported bifunctional organophosphorus extractant," Analytica Chimica Acta, 238, 263-271, (1990).
Horwitz, E.P., et al., "Separation and preconcentration of actinides from acidic media by extraction chromatography," Anal. Chim. Acta., 281, 361-372, (1993).
Horwitz, E.P., "A novel strontium-selective extraction chromatographic resin," Solv. Extr. Ion. Exch., 10, 313-336, (1992).
Idris, A., et al., "Distillable protic ionic liquids for keratin dissolution and recovery," ACS Sustainable Chemistry and Engineering, 2, 1888-1894, (2014).
Kirkland, "Superficially porous silica microspheres for fast high-performance liquid chromatography of macromolecules", Anal. Chem. 64, 1239-1245 (1992).
Jelinek, L. et al., "Selective Eu(III) electro-reduction and subsequent separation of Eu(II) from rare earths(III) via HDEHP impregnated resin," Solv. Extr. Ion Exch., 25, 503-513, (2007).
Jensen, M.P. et al., "Anion Effects in the Extraction of Lanthanide 2-Thenoyltrifluoroacetone Complexes into an Ionic Liquid", Sep. Sci. Technol. 47, 233-243 (2012).
Kabay, et al., "Solvent impregnated resins (SIRs)—Methods of preparation and their applications," React. Funct. Polym., 70, 484-496, (2010).
Kaminski, et al., "Optimization of a tandem ion exchange—Extraction chromatographic scheme for the recovery of strontium from raw urine," Sep. Sci. Technol., 55, 176-185, (2020).
Kawamura et al., "Adsorption and separation behavior of strontium and yttrium using a silica-based CMPO adsorbent," Journal of Radioanalytical and Nuclear Chemistry (2019) 320:9-14.
Kirkland, "Controlled surface porosity supports for high speed gas and liquid chromatography", Anal. Chem. 41, 218-220 (1969).
Klug, "Preparation and characterization of extraction chromatography resins using N-donor extractants for trivalent actinide and lanthanide separations," UNLV Theses, Dissertations, Professional Papers, and Capstones. 918. (2010).
Klug, C. et al., "A novel extraction chromatography resin for trivalent actinides using 2,6-bis(5,6-diisobutyl-1,2,4-triazine-3-yl)pyridine," Sep. Sci. Technol., 48, 2567-2575 (2013).
Kondo, K. et al., "Novel separation of samarium, europium, and gadolinium using a column packed with microcapsules containing 2-ethylhexylphosphonic acid mono-2-ethylhexyl ester," Chem. Eng. Trans., 32, 919-924, 2013.
Kraak, et al., "Anion exchange separation between Americium and Curium and between several Lanthanide elements," Journal of Inorganic and Nuclear Chemistry, 28, 221-234, 1966.
Kurosaki, et al., "Chromatographic separation of Am and Cm," Radiochimica Acta, 99, 65-69, 2011.

Li, S.-C. et al., "Separation of samarium, europium, and gadolinium in high purity using photochemical reduction-extraction chromatography," Hydrometallurgy, 178, 181-187, (2018).
Long, C., et al., "Adsorption of naphthalene onto macroporous and hyper-crosslinked polymeric adsorbent: Effect of pore structure of adsorbents on thermodynamic and kinetic properties," Colloids and Surfaces A:Physicochemical and Engineering Aspects, 333, 150-155, 2009.
Louis, R.E. et al. "Some parameters affecting the extraction chromatographic performance of TBP-impregnated macroporous XAD-4 columns for Am(III)-Eu(III) separations," J. Radioanal. Chem., 81, 305-315, 1984.
Majors, "Approaches to high-speed separations in HPLC", LC GC North America 26(1), (2008), Gale Academic OneFile.
Majors, "Developments in HPLC/UHPLC column technology", Recent Developments in LC Column Technology, 8-19, (2012).
McAlister, D.R et al., "Characterization of extraction chromatographic materials containing bis(2-ethyl-1-hexyl)phosphoricacid, 2-ethyl-1-hexyl(2-ethyl-1-hexyl)phosphonic acid, and bis(2,4,4-trimethyl-1-pentyl)phosphinicacid," Solv. Extr. Ion Exch., 25, 757-769, 2007.
McClaine, L.A et al., "The development and properties of an adsorbent for uranium. The Journal of Physical Chemistry," 62, 299-303, (1958).
McDowell, W. J. (1971). Equilibria in the system: di(2-ethylhexyl)phosphoric acid-benzene-water-alkali (hydroxide, nitrate). Journal of Inorganic and Nuclear Chemistry, 33, 1067-1079.
Melnik, M.I. et al., "Production of high-purity Gd-153. 2. Removal of samarium, terbium, and microamounts of europium from gadolinium by extraction chromatography," Radiochemistry, 37, 156-158, (1995).
Michalske, T. (Ed.), "Basic Research Needs for Countering Terrorism", Workshop Report, Office of Basic Energy Sciences, United States Department of Energy, 2002, p. 16. < https://science.osti.gov/-/media/bes/pdf/reports/files/nct_rpt_screen.pdf>.
Moller, K. et al, "Entrapment of PMMA polymer strands in micro- and mesoporous materials", Chem. Mater. 10, 1841-1852 (1998).
Momen, M.A., et al., "High-capacity extraction chromatographic materials based on polysulfone microcapsules for the separation and preconcentration of lanthanides from aqueous solution," Talanta, 197, 612-621, (2019).
Muraviev, D., et al., "Stabilization of solvent impregnated resin capacities by different techniques," React. Funct. Polym., 38, 259-268, (1998).
Nash, K.L. et al. (1997). Separations chemistry for actinide elements: Recent developments and historical perspective. Sep. Sci. Technol., 32, 255-274.
Omamogho, J.O. et al., "Next generation stationary phases: Properties and performance of coreshell columns", LC GC North America, 30(9), (2012). Gale Academic OneFile.
Parrish, J.R. "Macroporous Resins as Supports for a Chelating Liquid Ion-exchanger in Extraction Chromatography", Anal. Chem. 49, 1189-92 (1977).
Partridge, J.A. et al. (1969). Purification of di-(2-ethylhexyl)phosphoric acid by precipitation of copper (II) di-(2-ethylhexyl)phosphate. J. Inorg. Nucl. Chem., 31, 2587-2589.
Pawlak, et al., "Thermal Properties of Macrocyclic Polyethers: Implications for the Design of Crown Ether-based Ionic Liquids", Sep. Sci. Technol. 49, 2847-2855 (2014).
Payne, R.F., et al., "Investigation of gravity lanthanide separation chemistry," J Radioanal Nucl Chem.. 2011, 287, 863-867.
Peck, et al., "Use of di-(2-ethylhexyl) orthophosphoric acid for the separation of the elements lanthanum-gadolinium by reverse phase partition chromatography," Nature, 194, 84, (1962).
Pierce, T.B. et al., "Use of di-(2-ethylhexyl) orthophosphoric acid for the separation of the rare earths by reverse phase partition chromatography," Nature, 194, 597, (1962).
Plechkova, N.V., et al., "Applications of Ionic Liquids in the Chemical Industry", Chem. Rev. 37, 123-150 (2008).
Safari, V.; et al., "A Shrinking Particle—Shrinking Core Model for Leaching of a Zinc Ore Containing Silica", Int. J. Miner. Process. 93, 79-83 (2009).

(56) References Cited

OTHER PUBLICATIONS

Seddon, K.R.; Stark, A.; Torres, M-. J. "Viscosity and Density of 1-Alkyl-3-methylimidazolium Ionic Liquids", in Clean Solvents: Alternative Media for Chemical Reactions and Processing, M.A. Abrahams and L. Moens, Eds., American Chemical Society, Washington, DC, 2002, pp. 34-49.

Shuster, S. "Inside the Uranium Underworld: Dark Secrets, Dirty Bombs," Time.com, May 1, 2017.

Siekierski, et al., "Reversed-phase partition chromatography with di-(2-ethylhexyl) orthophosphoric acid as the stationary phase. Part II. Factors affecting the height of the plate," J. Chromatogr., 16, 385-395, (1964).

Sochacka, R.J. et al., "Reversed-phase partition chromatography with di-(2-ethylhexyl) orthophosphoric acid as the stationary phase. Part I. Separation of rare earths," J. Chromatogr., 16, 376-384, (1964).

Sun, X.; et al., "Extraction separation of rare-earth ions via competitive ligand complexations between aqueous and ionic-liquid phases," Dalton Trans. 40, 8019-8023, 2011.

Suzuki, et al., "Separation of americium and curium by use of tertiary pyridine resin in nitric acid/methanol mixed solvent system," Journal of Radioanalytical and Nuclear Chemistry, 272, 257-262, 2007.

Thomas, "Separation of trivalent lanthanides and actinides by extraction chromatography," Belgian Nuclear Higher Education Network, 2004, 74 pages.

Tokuda, et al., "Physicochemical properties and structures of room temperature ionic liquids. 2. Variation of alkyl chain length in imidazolium cation," Journal of Physical Chemistry B, 109, 6103-6110, 2005.

Uchiyama et al., "High-resolution separation of neodymium and dysprosium ionsutilizing extractant-impregnated graft-type particles," Journal of Chromatography A, 2018, 1533, 10-16.

Varyani, M.; Khatri, P.K.; Ghosh, I.K.; Jain, S.L. "Silver assisted separation of n-decane/1-decene using distillable CO2-derived alkyl carbamate ionic liquids", Fluid Phase Equilibria 412, 101-106 (2016).

Wang, Y. et al., "Recent advances in ordered meso/macroporous metal oxides for heterogeneous catalysis: a review," J. Mater. Chem. A. 5, 8825-8846, (2017).

Wang, Q. et al., "Mutual separation of rare earth elements by extraction chromatography using bis(1,1,3,3-tetramethylbutyl)phosphinic acid as a stationary phase," Anal. Sci., 13, 153-156, (1997).

Wankowski, et al., "Ionic Liquid (IL) Cation and Anion Structural Effects on Metal Ion Extraction into Quaternary Ammonium-based ILs", Solv. Extr. Ion Exch. 34, 48-59 (2016).

Wei et al., "Studies on the Separation of Minor Actinides from High-Level Wastes by Extraction Chromatography Using Novel Silica-Based Extraction Resins," Nuclear Technology, vol. 132, 413-423, (2000).

Wei, T.-C. et al., Synthesis, characterization, and evaluation of a superficially porous particle with unique, elongated pore channels normal to the surface, J. Chrom. A 1440, 55-65 (2016).

Wei, J,-X. et al., Synthesis of penetrable macroporous silica spheres for high-performance liquid chromatography, J. Chrom.A. 1216 (2009) 7388-7393.

Wu et al., "Equilibrium and kinetic studies of selective adsorption and separation for strontium using DtBuCH18C6 loaded resin," Journal of Nuclear Science and Technology vol. 49, No. 3, March, pp. 320-327, (2012).

Yang et al., "Adsorption of surfactants onto acrylic ester resins with different pore size distribution," Science in China, Series B: Chemistry, 49, 445-453, (2006).

Zdravkov, B. D., et al., "Pore classification in the characterization of porous materials: A perspective," Central European Journal of Chemistry, 5, 385-395, (2007).

Zhang et al., "Impregnation synthesis of a novel macroporous silica-based crown ether polymeric material modified by 1-dodecanol and its adsorption for strontium and some coexistent metals," Separation and Purification Technology 62, 407-414, (2008).

Zhang et al., "Modification of a novel macroporous silica-based crown ether impregnated polymeric composite with 1-dodecanol and its adsorption for some fission and non-fission products contained in high level liquid waste," European Polymer Journal 44 (2008) 3899-3907.

Zhang, A et al., "SPEC Process III. Synthesis of a macroporous silica-based crown ether-impregnated polymeric composite modified with 1-octanol and its adsorption capacity for Sr(II) ions and some typical co-existent metal ions," Adsorpt. Sci. Technol., 26, 705-720, (2008).

METHOD FOR THE PREPARATION OF CONTROLLED POROSITY SUPPORTS FOR CHROMATOGRAPHIC SEPARATION

CROSS-REFERENCE TO RELATED APPLICATIONS

This application claims priority to U.S. Provisional Application No. 62/925,753, filed Oct. 24, 2019, which is hereby incorporated by reference in its entirety.

STATEMENT OF GOVERNMENT INTEREST

This invention was made with government support under grant number DE-AC02-98CH10886 awarded by the Department of Energy. The government has certain rights in the invention.

TECHNICAL FIELD

The present disclosure relates to porosity supports comprising an inert filler and metal ion binding extractant that may be used for chromatographic separation of metal ions. Also disclosed herein are methods for preparing the porous supports.

BACKGROUND

Metal ion separations constitute an important component of numerous industrial manufacturing and waste-treatment processes and represent an integral part of many analytical methods for metal ion determination in a number of matrices. Numerous extraction chromatographic materials have been developed for a wide range of applications, particularly in the field of radiochemical separations. One of the most difficult challenges is separating metal ions of similar chemical and physical makeup. No region of the periodic table better illustrates this than the f-elements. Known for their similar ionic radii and oxidation state, these metal ions remain a challenge to separate not only in extraction chromatographic applications, but in liquid-liquid and ion-exchange separations as well.

Of the variety of methods that have been described for these separations, few rival liquid-liquid extraction (i.e., solvent extraction; SX) in terms of selectivity and versatility. Unfortunately, solvent extraction has several significant disadvantages, particularly when applied to large numbers of samples in analytical-scale separations. That is, while modern chemical analysis requires methods that provide reasonably high throughput at low cost and generate minimal waste, liquid-liquid extraction can be cumbersome, time-consuming and labor-intensive. In addition, it can consume significant volumes of expensive organic solvents and generate correspondingly large volumes of potentially toxic wastes. To avoid these problems, many investigators have turned to methods employing packed columns of ion-exchange (IX) resins. While simpler, less cumbersome and expensive, and less prone to the generation of noxious wastes, IX lacks the selectivity required for many separations.

Extraction chromatography (EXC) combines many of the advantages of SX, most notably its selectivity, with the simplicity and ease of handling of IX materials. Briefly, in EXC, an extractant or solution of an extractant in an appropriate organic solvent is absorbed in the pores of an inert (usually), porous (often polymeric) support (e.g., polyester beads), where it is retained, primarily by capillary forces. The resultant materials can then be packed in a column and employed in much the same way as IX resins or other chromatographic materials. Since it was first described in the 1950's, EXC has found extensive use in chemical analysis, particularly in radiochemical methods, where it provides a facile means for the separation and preconcentration of a variety of radionuclides for subsequent determination.

Several commercial extraction chromatographic resins (manufactured by EiChrom Technologies, LLC (Lisle, Ill.)), consist of an inert support (e.g. Amberchrom CG-71m) impregnated with a suitable extractant, which are designed to be selective for f-element families of metal ions. DGA resin, for example, is used to extract both lanthanides and actinides while Ln and Ac resins are selective to lanthanides and actinides, respectively. To ensure adequate metal ion uptake capacity, the pores of the support are generally filled nearly to capacity with extractant (40% (% w/w) loading). Unfortunately, this near-capacity filling produces long metal ion diffusion paths within the resin, reducing column efficiency. The modest column efficiency of the material is reflected in their inadequate performance in certain important applications. For example, Gharibyan et al. attempted to separate $Am^{3+}$ from $Cm^{3+}$ using seven different EiChrom resins, but observed nearly identical elution behavior for the two ions on all resins (Gharibyan et al., 2014. *Solvent Extraction and Ion Exchange*, 32, 391-407). Similarly, Bertelsen et al. attempted to separate $Eu^{3+}$ from $Nd^{3+}$ using EiChrom Ln resin but observed almost complete overlap between the two during elution studies (Bertelsen et al., 2019. *Journal of Chromatography A*, 1595, 248-256).

Despite wide application, extraction chromatography is not without limitations. First, because the extractant is not chemically bonded to the support, the physical stability of EXC materials is frequently unsatisfactory. In addition, the capacity of EXC resins is often limited, thus necessitating at times the use of inconveniently large columns to avoid resin saturation. Finally, to permit reasonable mobile phase flow rates without applied pressure, the particle size of typical EXC materials (ca. 50-150 µm) is rather large by the standards of conventional chromatography, where ca. 5-10 µm particles are more the norm. In addition, the inert supports generally used to prepare EXC resins possess complex internal structures that include pores deep within the particles in which metal ion diffusion is restricted. As a result, the column efficiency of most EXC systems is poor, resulting in wide elution bands and thus, difficulty in resolving species with comparable affinity for the supported extractant. In addition, peak tailing can be significant, complicating removal of retained ions during column stripping and again, adversely affecting separations performance.

Column efficiency, expressed below as the height equivalent to a theoretical plate (HETP), is governed by several factors, expressed mathematically in the van Deemter Equation:

$$HETP = A + B/u + (C_m + C_s)u \qquad (1)$$

where A, B, $C_s$, $C_m$, and u represent the eddy diffusion of the analyte between particles, its axial diffusion within the column, its mass transfer rate between the mobile and stationary phases, and the mobile phase velocity, respectively.

Thus, there remains a need for a chromatographic extraction method that utilizes an inert, pore-blocking reagent, with maximized compatibility with the support and low water solubility.

SUMMARY

In one aspect, the present invention provides an extraction chromatographic (EXC) support comprising (a) a porous support comprising pores; the pores comprising small pores (<4 nm), intermediate pores (4-20 nm), and large pores (>20 nm); (b) an inert filler of the porous polymer support; and (c) a metal ion binding extractant; wherein the small pores are impregnated with the filler and the intermediate and/or large pores are impregnated with the metal ion binding extractant.

Another aspect provides a method of preparing the EXC support of the invention.

Another aspect provides a method of using the EXC support of the invention to separate metal ions.

The disclosure provides for other aspects and embodiments that will be apparent in light of the following detailed description and accompanying figures.

DETAILED DESCRIPTION

1. Definitions

Figure 1:
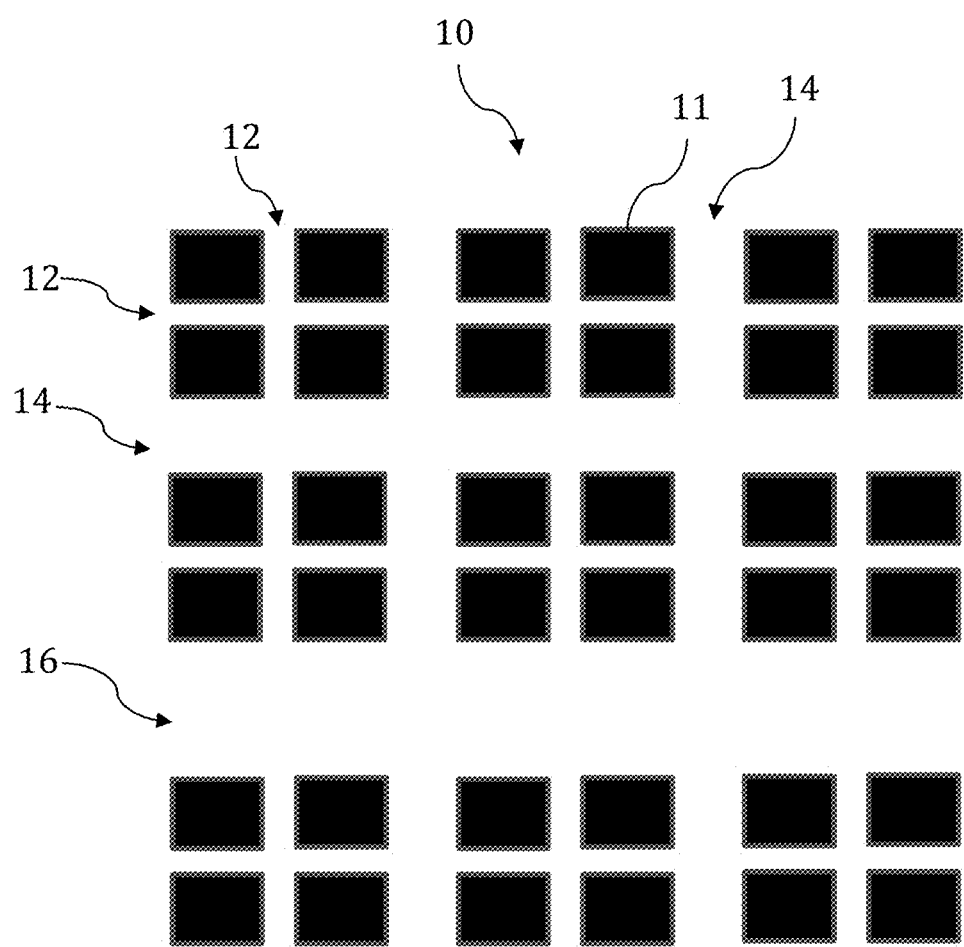
FIG. 1 shows an idealized depiction of a network of pores of an unfilled porous support.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Porous Support

Commercial supports possess a complex system of micro- (<2 nm), meso- (2-50 nm), and macropores (>50 nm), resulting in an essentially infinite number of paths for analyte diffusion and thus, sources of inefficiency. See Zdravkov, B. D., Čermák, J. J., Šefara, M., & Janků, J. (2007). "Pore classification in the characterization of porous materials: A perspective," *Central European Journal of Chemistry*, 5, 385-395. The micropores are mostly found within the larger meso- and macropores. During the filling of the empty support with extractant, the micropores are filled first, with the meso- and macropores acting as transport pores. Given the location of the micropores, metal ions trapped within would almost certainly cause band broadening during elution. Blocking these pores within the support should therefore decrease this source of band broadening, provided that the blocking reagent (i.e. filler) is carefully chosen.

The present disclosure addresses the issue of poor column efficiency and peak tailing in extraction chromatography and comprises a method for the modification of a conventional EXC support that serves to confine extractant to the most readily accessible regions of the support, either in a narrow zone at or near the surface of the support particles ("surface-porous" or "core-shell" EXC materials) or in accessible pores located throughout the support ("pore-blocked/extractant-loaded" EXC materials). The result in both instances is an increase in the number of theoretical plates (N) associated with the chromatographic column and a concomitant increase in column efficiency, which is reflected in a significant narrowing of the elution band for a given metal ion.

FIG. 1 shows an idealized rendering of a pore network of a porous support 10 that comprises a solid support material 11, small pores 12, intermediate pores 14, and large pores 16.

Porous extraction chromatography (EXC) supports are known and have been described in the following references, which are incorporated herein by reference: E. P. Horwitz and C. A. A. Bloomquist, "High-speed radiochemical separations by liquid-liquid chromatography using CSP support. I. Performance of quaternary ammonium chloride-Zipax system for the elution of Cd(II) with HCl", J. Chrom. Sci. 12, 11-22 (1974); E. P. Horwitz and C. A. A. Bloomquist, "High-speed radiochemical separations by liquid-liquid chromatography using a CSP support. II. Separation of metal ions using tricaprylmethylammonium chloride on Zipax", J. Chrom. Sci. 12, 200-205 (1974); Y. Wei, M. Kumagai, Y. Takashima, G. Modolo, R. Odoj, "Studies on the separation of minor actinides from high-level wastes by extraction chromatography using novel silica-based extraction resins", Nucl. Technol. 132, 413-423 (2000); S. Uchiyama, T. Sasaki, R. Ishihara, K. Fujiwara, T. Sugo, D. Umeno, K. Saito, "High-resolution separation of neodymium and dysprosium ions using extractant impregnated graft-type particles", J. Chrom. A 1533, 10-16 (2018); Ansari et al., "A review on solid phase extraction of actinides and lanthanides with amide based extractants," J. Chromatogr. A. 1499 (2017) 1-20; J. R. Parrish, "Macroporous resins as supports for a chelating liquid ion-exchanger in extraction chromatography," *Anal. Chem.* 49 (1977) 1189-1192; J. R. Dominguez, T. Gonzalez, P. Palo, E. M. Cuerda-Correa, "Removal of common pharmaceuticals present in surface waters by Amberlite XAD-7 acrylic-ester-resin: Influence of pH and presence of other drugs," *Desalination* 269 (2011) 231-238; Bhatti et al., 2017. *J Chem*. 10, S1111-S1118; Wei et al., 2009. *J. Chrom. A.* 1216, 7388-7393 (macroporous silica unfunctionalized or silanized); Wang et al., 2017. *J. Mater. Chem. A.* 5, 8825-8846 (macroporous ceramics (e.g., alumina) and metal oxides); Harada et al., 2019. *Bull. Chem. Soc. Jpn*. 92, 1444-1446 (macroporous cellulose); and Arias, A.; Saucedo, I.; Navarro, R.; Gallardo, V.; Martinez, M.; Guibal, E. "Cadmium Recovery from Hydrochloric Acid Solutions Using Amberlte XAD-7 Impregnated with a Tetraalkylphosphonium Ionic Liquid," *React. Funct. Polym*. 71, 1059-1070 (2011).

The porous support may, for example, be a porous polyester support, which may be in the form of polyester beads. The polyester support may be made of macroporous acrylic ester polymers of "moderate polarity." In some embodiments, the macroporous acrylic ester polymers may be characterized by the following: $\mu=1.8$ D, high surface area (>300 m$^2$/g), and high water regain (Parrish, 1977. *Anal. Chem*. 49, 1189-1192). In some embodiments, the polyester support may be an aliphatic (acrylic ester) polymer resin. Commercial polyacrylic ester supports include Amberlite® XAD-7 resin and Amberchrom® CG-71 resin.

The porous support may, for example, be a porous polystyrene support, which may be in the form of polystyrene beads. The polystyrene support may be made of macroporous polyaromatic polymers of lower polarity. In some embodiments, the macroporous polyaromatic polymers may be characterized by the following: μ=0.3 D and high surface area (>300 m$^2$/g). Commercial polystyrene supports include Amberlite® XAD-2, XAD-4, and XAD-16.

The porous support contains a network of micropores, mesopores, and macropores. In some embodiments, the pores are classified as small (<4 nm), intermediate (4-20 nm) and large (>20 nm).

The porous support material may have a particle size of about 30-170 μm, about 40-170 μm, about 50-170 μm, about 60-170 μm, about 30-160 μm, about 40-160 μm, about 50-160 μm, about 60-150 μm, about 30-150 μm, about 40-150 μm, about 50-150 μm, about 30-140 μm, about 40-140 μm, about 50-140 μm, or about 60-140 μm. In a particular embodiment, the porous support 10 material may have a particle size of about 50-150 μm.

Figure 2:
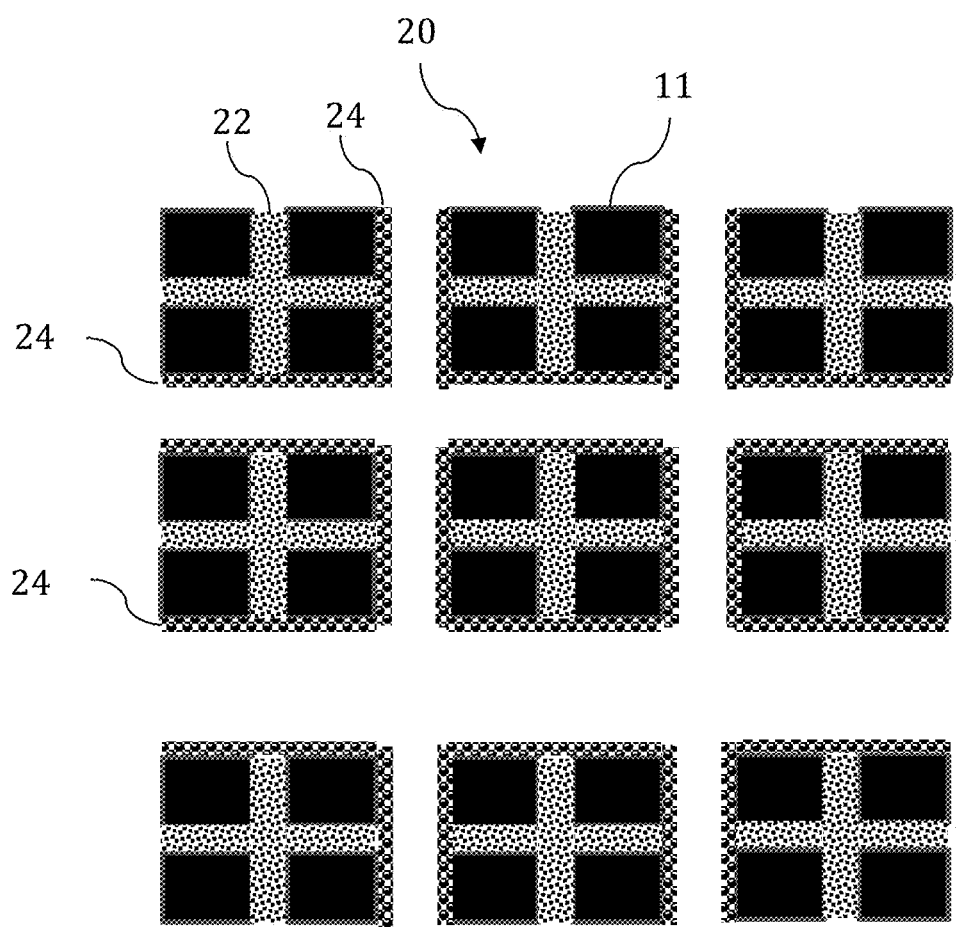
FIG. 2 shows an idealized depiction of a network of pores of a porous support with small pores filled with a pore filler and intermediate and large pores impregnated with an extractant.
Figure 3:
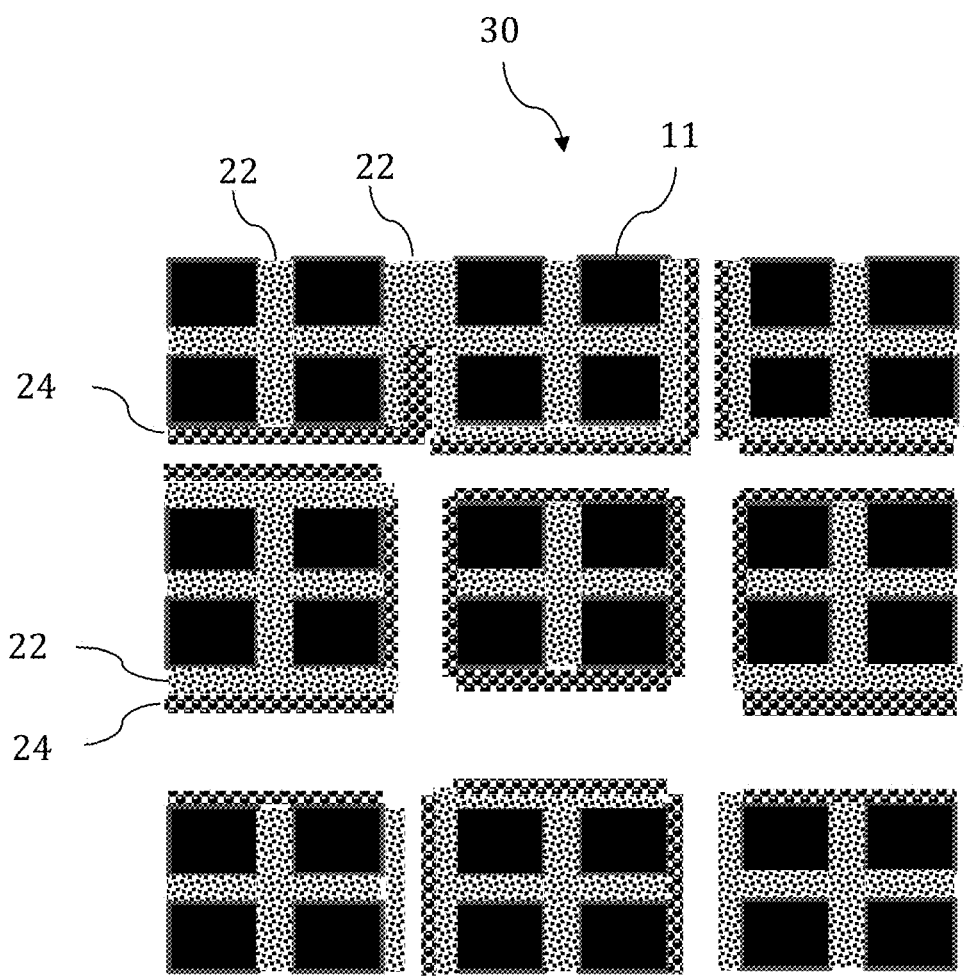
FIG. 3 shows an idealized depiction of a network of pores of a porous support with small pores filled with a pore filler, intermediate and large pores partially filled with pore filler, and an extractant impregnated in intermediate and large pores.
Figure 4:
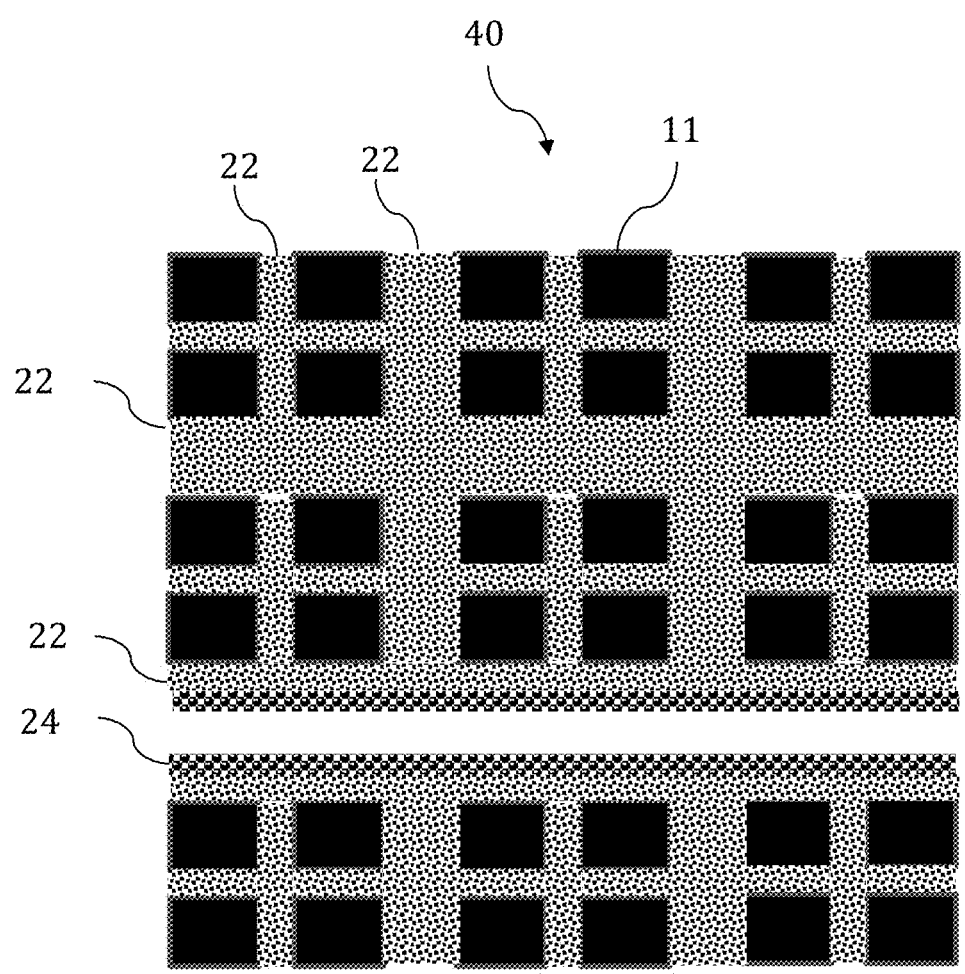
FIG. 4 shows an idealized depiction of a network of pores of a porous support with small and intermediate pores filled with pore filler, large pore partially filled with pore filler, and an extractant impregnated in large pores.
Figure 5:
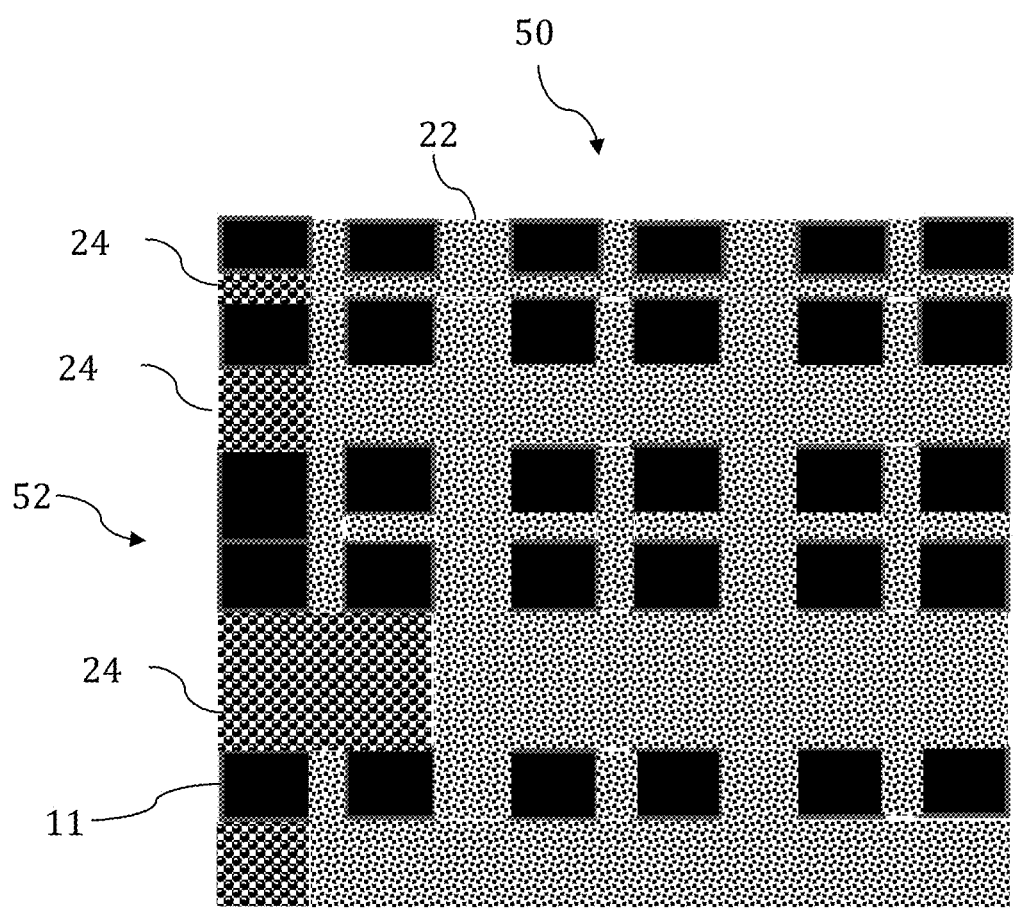
FIG. 5 shows an idealized depiction of a network of pores of a porous support with small, intermediate, and large pores filled in the interior of the network with a pore filler and a layer of extractant impregnated in the pores at the surface of the pore network.
Figure 6:
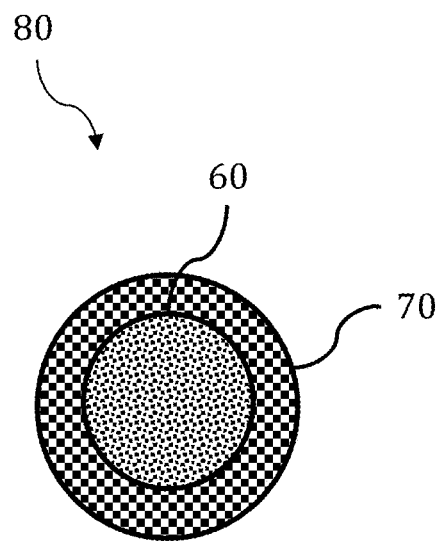
FIG. 6 shows an idealized depiction of a porous support bead with a core-shell arrangement, with a pore filler impregnated in the core and an extractant impregnated in the shell.

The porous support may be filled with a pore filler to varying degrees. In the porous support 20 in FIG. 2, a pore filler 22 occupies small pores and an extractant 24 is impregnated into the intermediate and large pores. FIG. 3 illustrates a greater degree of pore filling of a porous support 30, with the pore filler 22 occupying small pores and partly filling intermediate and large pores. In porous support 30, extractant 24 impregnates the intermediate and large pores, either layered over the pore filler 22 or directly on the solid support material 11. FIG. 4 illustrates a still greater degree of pore filling of a porous support 40, with pore filler 22 occupying small and intermediate pores, and partly filling large pores and extractant 24 confined to large pores in a layer over the filler 22. FIG. 5 shows a portion of a porous support 50 having an exterior surface 52, where filler 22 is loaded into small, intermediate, and large pores in the interior portion of the support 50, and an extractant is impregnated in small, intermediate, and large pores near the surface of the support. FIG. 6 depicts a porous support in the form of a bead or particle 80, where the interior region of the bead (the core) 60 is impregnated with pore filler and the outer region of a bead (shell) 70 is impregnated with extractant.

Suitable filler materials include a $C_{11-16}$alkyl alcohol or esters, ketones, or carboxylic acids of comparable polarity, such as total polar surface area. Other suitable filler materials include low molecular weight polymers, ionic liquids, or long-chain paraffinic hydrocarbons. Preferably, filler polarity is matched with the porous support material for optimal occupancy of pore space. In some embodiments, the filler is a water-immiscible filler.

In some embodiments, the filler may be a $C_{11-16}$alkyl alcohol. A $C_{11-16}$alkyl alcohol refers to an alkyl group having from 11-16 carbon atoms (straight or branched chain) and substituted by a hydroxyl group. In some embodiments, the $C_{11-16}$alkyl alcohol is a primary $C_{11-16}$alkyl alcohol (i.e., hydroxyl is substituted on a terminal carbon atom of the alkyl). Examples include 1-undecanol, 1-dodecanol (i.e., lauryl alcohol), 1-tridecanol, 1-tetradecanol, 1-pentadecanol, or 1-hexadecanol (i.e., cetyl alcohol). Preferably, the pore filler is 1-dodecanol, which has the advantages of ready availability, low cost, a melting point (24° C.) is just above room temperature. Therefore, it is a solid under conditions at which the sorbents are normally employed (ca. 20° C.), making it difficult to remove from the support during normal column operation and minimizing its interaction with an extractant. Further, 1-dodecanol can be readily loaded into a support at slightly elevated temperature (e.g., 40° C.), where it is a free-flowing liquid.

In some embodiments, the filler may be a low molecular weight polymer. In some embodiments, the low molecular weight polymer may be poly(propylene glycol) ("PPG"; MW=400 g/mol) or polytetrahydrofuran.

In some embodiments, the filler may be an ionic liquid (IL). ILs have extraordinary tunability and therefore, the filler can be "tailored" to the support whose pores are to be filled. In addition, among the characteristics of many ILs is a steep dependence of viscosity on temperature (steeper than that observed for typical molecular liquids). The significance of this property is two-fold: it means that ILs can be readily loaded into a support at elevated temperature, where their viscosity is modest and their high viscosity at room temperature means that they are difficult to remove (under normal operating conditions) from the inner pores of a support. Thus, the core of the sorbent may exhibit excellent stability. In some embodiments, the IL may be a water-immiscible ionic liquid (e.g., short-chain imidazolium-based ILs). In some embodiments, the IL may be 1-(12-hydroxydodecyl)-3-methylimidazolium salts with the following structure:

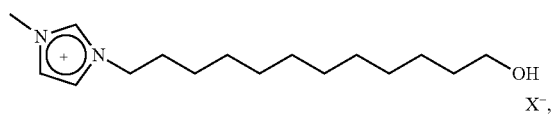

wherein X- may be a halide, $Tf_2N$ (e.g., 1-dodecyl-3-methylimidazolium bis[(trifluoromethyl)sulfonyl]imide ($C_{12}mim^+Tf_2N^-$, $C_{16}mim^+Tf_2N^-$)), or $BF_4$ (e.g., $C_{12}mim^+BF_4^-$).

In some embodiments, the IL may be trihexyltetradecylphosphonium bis(trifluoromethanesulfonyl)imide $P_{66614}^+Tf_2N^-)^-$, trihexyltetradecylphosphonium tetrafluoroborate ($P_{66614}^+BF_4^-$), distillable ionic liquids (e.g., dimethylammonium dimethyl carbamate, or N,N-dimethylethanolammonium formate), or ionic liquid crystals (e.g., Seddon et al., 2002. in *Clean Solvents: Alternative Media for Chemical Reactions and Processing*, M. A. Abrahams and L. Moens, Eds., American Chemical Society, Washington, D.C., 34-49).

In some embodiments, the filler may be a long-chain paraffinic hydrocarbon. In some embodiments the long-chain paraffinic hydrocarbon may be eicosane.

In some embodiments, the filler may be 1-dodecanol, $C_{12}mim^+Tf_2N^-$, $C_{16}mim^+Tf_2N^-$, $C_{12}mim^+BF_4^-$, trihexyltetradecylphosphonium bis(trifluoromethanesulfonyl)imide ($P_{66614}^+Tf_2N^-)^-$, or trihexyltetradecylphosphonium tetrafluoroborate ($P_{66614}^+BF_4^-$), dimethylammonium dimethyl carbamate, or N,N-dimethylethanolammonium formate.

The filler as detailed herein may occupy a volume fraction of the pores of the porous support in amounts ranging from 0.075 to 0.82. For example, the volume fraction of pores occupied by filler may be from 0.075 to 0.15, from 0.075 to 0.2, from 0.075 to 0.32, from 0.075 to 0.4, from 0.075 to 0.5, from 0.075 to 0.6, from 0.075 to 0.7, from 0.15 to 0.3, from 0.3 to 0.82. For example, the volume fraction of pores occupied by filler may be 0.075, 0.1, 0.15, 0.2, 0.25, 0.32, 0.4, 0.45, 0.5, 0.6, 0.7, or 0.82. Generally, the process of pore filling will fill the pores in the order of smaller to larger. Without wishing to be bound by theory, it is believed that a volume fraction occupancy of about 0.15 corresponds with filling of small pores for a polyacrylic ester like Amberchrom® CG-71.

Suitable metal ion binding extractants include lanthanide and/or actinide ion and/or alkaline earth ion binding extractants. Lanthanide ions are ions of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Actinide ions are ions of actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr). Preferably, the lanthanide and/or actinide is selected from Nd, Sm, Eu, Gd, Tb, Np, Pu, Am, Cm, Bk, and Dy. Alkaline earth ions include Sr, Ca, Ba, and Ra.

For example, the metal ion binding extractants include crown ethers, calixarenes, neutral or acidic organophosphorus extractants, glycolamide, malonamide, or monoamide extractants, or liquid cation or anion exchangers. Crown ethers include, for example, di-tert-butylcyclohexano-18-crown-6 or 4',4'(5")-di(tert-butylcyclohexano)-18-crown-6. Calixarenes include calix[4]arene-bis(tert-octylbenzo-crown-6). Neutral or acidic organophosphorus extractants include dialkyl phosphoric acid, phosphonic acid, phosphinic acid, trialkylphosphate, or trialkylphosphine oxide (TRPO) extractants, such as bis(2-ethylhexyl)phosphoric acid (HDEHP), diisodecylphosphoric acid (DIDPA), 2-ethylhexylphosphonic acid mono-2-ethylhexyl ester (HEH[EHP]), dipentyl pentylphosphonate, octyl(phenyl)-N,N-diisobutylcarbamoylmethylphosphine oxide (CMPO), tri-n-butyl phosphate (TBP), and trialkyl phosphine oxide (TRPO). The glycolamide, malonamide, or monoamide extractants include, for example, N,N,N',N'-tetra-n-octyl-diglycolamide (TODGA), N,N'-dimethyl-N,N'-dibutyl tetradecylmalonamide (DMDBTDMA), N,N'-dimethyl-N,N'-dioctyl-2-(2-hexyloxy-ethyl)-malonamide (DMDOHEMA), N,N,N',N'-tetrakis-2-ethylhexyldiglycolamide (TEHDGA), di-2-ethylhexyl butyramide (D2EHBA), di-2-ethylhexyl-isobutryamide (D2EHiBA), di-2-ethyhexyl acetylamide (D2EHAA), and N,N'-dimethyl-N,N'-dioctyl-3-oxa-diglycolamide (DMDODGA). The liquid cation or anion exchanger may include a quaternary ammonium salt, such as quaternary ammonium chlorides (Aliquat 336™).

The EXC support may be impregnated with the extractant in an amount of 5-30 weight % of the weight of the porous support impregnated with the filler. For example, the extractant may be impregnated in an amount of 5%, 10%, 15%, 20%, or 30%, by weight, of the weight of the porous support impregnated with the filler. In a preferred embodiment, the porous support is first impregnated with 0.15 volume fraction of the pore filler (e.g., 1-dodecanol) and further impregnated with extractant (e.g., HDEHP) in an amount of 10 weight % of the weight of the porous support impregnated with the filler.

To address the issues of inadequate column efficiency and peak tailing, the extractant may be confined to only the most accessible or near-surface regions of the support by filling the support with a greater volume of pore filler. The extractant may be confined to the most accessible pores, regardless of their location in the support.

Alternatively, the extractant may not be restricted to the near-surface regions of the support by filling the support to a lesser degree with the pore filler. The extractant is thereby not restricted to the near-surface regions of the support for the pore-blocked/extractant-loaded materials. Either variation provides an increased number of theoretical plates (N) for a given column length (i.e., an increase in column efficiency), which is reflected in a narrowing of the elution band for a given metal ion, and a reduction in peak tailing. The result is improved separation of metal ions whose affinity for the supported extractant is similar.

3. Methods of Preparing an EXC Support

Figure 7:
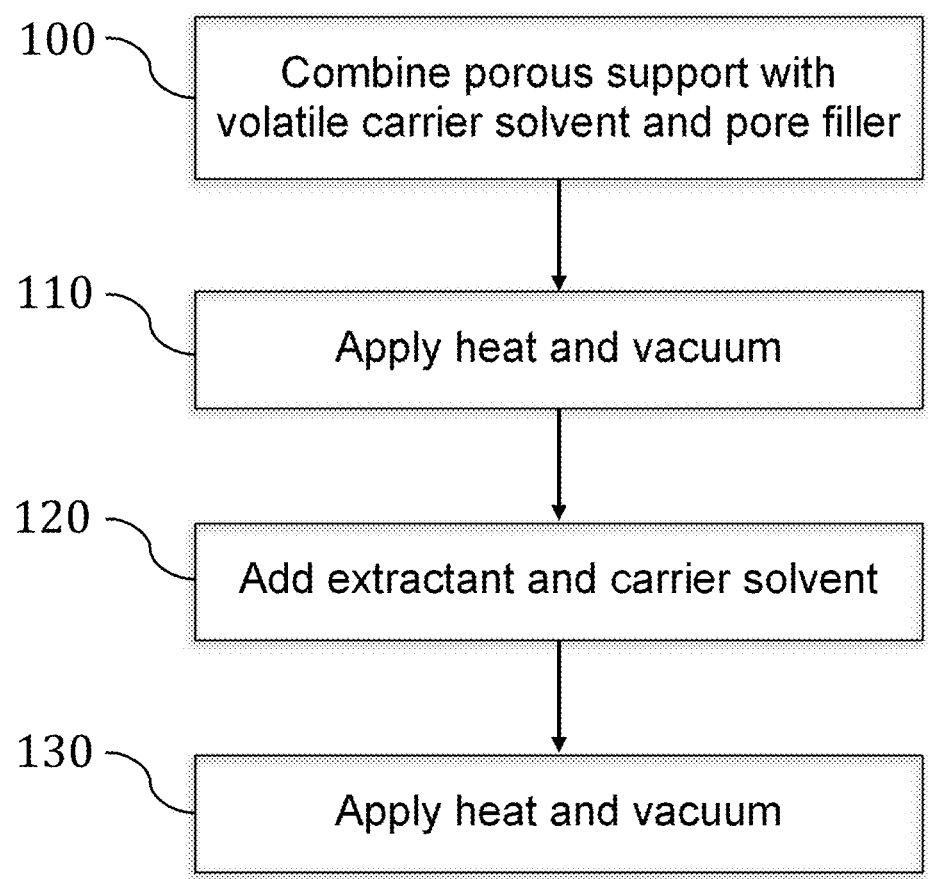
FIG. 7 shows a block diagram depicting a process for the preparation of a surface-porous extraction chromatographic material as disclosed herein.

The pore-blocked/extractant-loaded EXC materials as disclosed herein may be prepared according to the process of FIG. 7. In step 100, a porous support is combined with a volatile carrier solvent and pore filler for a sufficient time to allow the dissolved filler to penetrate the pore network. Next, heat and vacuum are applied (step 110) to remove the volatile solvent and provide a porous support impregnated with the filler material. This filler-laden support (also referred to as a "stagnant pore-plugged material") is then impregnated with an extractant by addition of a mixture of extractant and carrier solvent (step 120), followed by the application of heat and vacuum to remove the carrier solvent (step 130). It is believed that the narrowest and thus, most difficult to access pores of a porous polymer support are blocked first with an inert filler. The result is a sorbent whose least accessible pores are obstructed and whose most easily accessible pores are coated with a thin layer of extractant, which is thus readily available for interaction with metal ions. It is expected that with an appropriate support, this method may work for any non-reactive combination of filler material and extractant.

Figure 8:
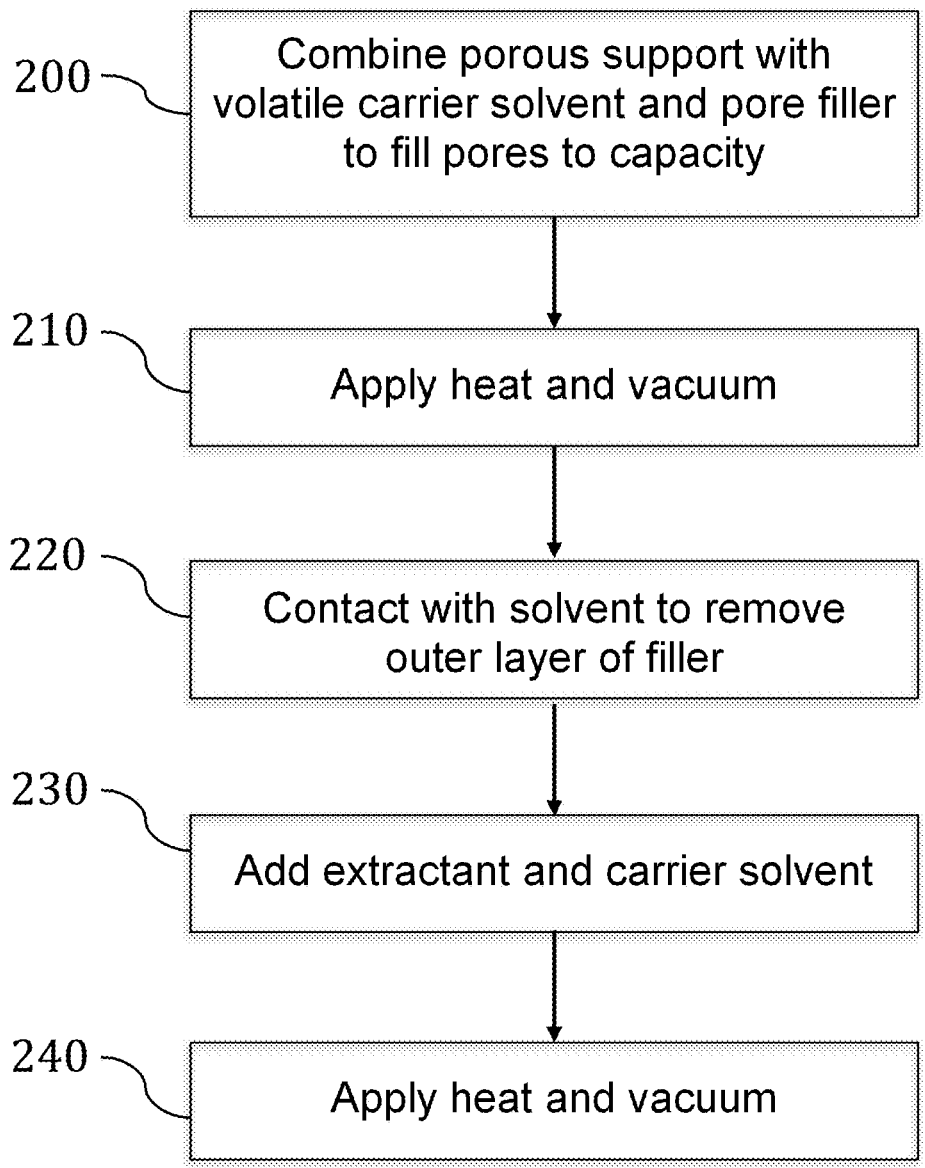
FIG. 8 shows a block diagram depicting a process for the preparation of a surface-porous extraction chromatographic material as disclosed herein.

The surface-porous EXC materials as disclosed herein may alternatively be prepared according to the process described in FIG. 8. In step 200, a porous support is combined with a mixture of a volatile carrier solvent and pore filler, in an amount sufficient to fill the pores of the support to capacity with the filler. Next, heat and vacuum are applied to remove the volatile carrier solvent (step 210). The resultant impregnated support is then washed with a solvent in which the filler is readily soluble, to strip an outer layer of the filler from the most easily accessible pores of the support (step 220). The partially stripped support is impregnated with extractant by treatment with a mixture of extractant and carrier solvent (step 230) and carrier solvent removed by the application of heat and vacuum (step 240). The result is a material whose innermost (and thus, least accessible) pores are blocked by the filler and whose most readily accessible (i.e., exterior) pores are filled with extractant. It is expected that with an appropriate support, this method may work for any non-reactive combination of filler material and extractant.

4. Methods of Separating Metal Ions

Further provided herein are methods of separating metal ions. The method may include (1) contacting a solution comprising two or more different metal ions with the EXC support as described herein loaded in a chromatographic column, (2) eluting the metal ion-containing solution through the chromatographic column, and (3) separating the two or more different metal ions. The elution through the chromatographic column may be conducted using apparatus and solvent systems well known to those skilled in the art.

The two or more different metal ions may be selected from lanthanide and actinide, such as trivalent lanthanides and actinides. In some embodiments, the two or more different metal ions may be selected from La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, and Lr. In some embodiments, the two or more different metal ions may be selected from Nd, Sm, Eu, Gd, Tb, Np, Pu, Am, Cm, Bk, and Dy.

The two or more different metal ions may be selected from lanthanide, actinide ions, and alkaline earth ions. In some embodiments, the alkaline earth ions are selected from Sr, Ca, Ba, and Ra.

Inter-lanthanide separations include but are not limited to the separation of europium and samarium, europium and gadolinium, or europium and neodymium or inter-actinide separations (americium-curium) or for the group separation of trivalent actinides and lanthanides.

5. Examples

Example 1

Materials and Instrumentation

Materials. All water was obtained from a Milli-Q2 system and exhibited a specific resistance of at least 18 MΩ-cm. HDEHP, 1-dodecanol, 1-bromododecane, 1-bromohexadecane, 1-methylimidazole, lithium tetrafluoroborate ($LiBF_4$), silver nitrate, cetyl alcohol, eicosane, dimethylammonium dimethylcarbamate (DIMCARB), formic acid (HCOOH), N,N-dimethylethanolamine (DMEA) and polytetrahydrofuran (PTHF) 250 were obtained from Sigma-Aldrich (St. Louis). Lithium bis[(trifluoromethyl)sulfonyl]imide ($Li^+$ $Tf_2N^-$) was purchased from TCI America (Portland, Oreg.). 1-ethyl-3-methylimidazolium bis(trifluoromethanesulfonyl) imide ($C_2mim^+Tf_2N^-$) was purchased from Covalent Associates Inc. (Woburn, Mass.). Methanol (ACS Grade), hexanes (ACS Grade), and nitric acid (Optima) were purchased from Fisher Scientific (Hampton, N.H.). Ethanol (200 proof) was purchased from KOPTEC (King of Prussia, Pa.). Trihexyltetradecylphosphonium bis(trifluoromethanesulfonyl)imide ($P_{66614}^+Tf_2N^-$) and its chloride ($P_{66614}^+Cl^-$), and tetrafluoroborate ($P_{66614}^+BF_4^-$) analogues were a generous gift from Cytec Industries (Woodland Park, N.J.). The N,N-dimethylethanolamine formate was synthesized according to published procedures (Idris et al., 2014. *ACS Sustainable Chemistry and Engineering*, 2, 1888-1894). Briefly, equimolar amounts of DMEA and HCOOH were mixed for one hour in an ice bath. The $C_{12}mim^+Tf_2N^-$, $C_{12}mim^+BF_4^-$, and $C_{16}mim^+Tf_2N^-$ were synthesized via a two-step procedure involving quaternization of the methylimidazole with 1-bromododecane or 1-bromohexandecane to yield the halide form of the IL ($C_n mim^+Br^-$), followed by anion metathesis to provide the desired (e.g., $Tf_2N^-$) product (Deetlefs et al., 2003. *Green Chem.*, 5, 181-186; Fredlake et al., 2004. *J. Chem. Eng. Data*, 49, 954-964). The resulting IL was water washed until no precipitate (AgBr) was observed upon mixing the water wash with silver nitrate. Its identity was confirmed by $^1$H-NMR. Ln resin and Pre-filter (20-50 μm) material were purchased from the EiChrom (Lisle, Ill.). (Note that the Pre-filter resin is simply a small particle analogue of Amberchrom CG-71m). Amberchrom CG-71m was purchased from Sigma and was purified as described previously. Briefly, the Amberchrom CG-71m or Pre-filter resin was contacted with deionized water for 30 minutes with occasional swirling and then removed. The resin was then contacted with methanol, which was allowed to flow through the resin under gravity. The process was repeated twice more until the methanol wash was clear and colorless and the water wash was pH ≤7. The $^{152/154}$Eu and $^{137}$Cs radiotracers were purchased from Eickert and Ziegler (Berlin, Germany). Europium (III) nitrate pentahydrate, neodymium (III) nitrate hexahydrate and gadolinium (III) nitrate hexahydrate were trace metal grade (99.9% pure) and purchased from Sigma-Aldrich. Elution profiles were obtained on BioRad Econo-Column chromatography columns (Hercules, Calif.) with dimensions of 0.5×5 cm or 0.5×10 cm.

Instrumentation. The radiotracers were assayed using a Perkin-Elmer Model 2480 Automatic Gamma counter. Inactive metal ions were assayed using a Shimadzu Model 2030 Inductively-Coupled Plasma-Mass Spectrometer (ICP-MS) 2030. Surface area determinations were conducted using a Micromeritics ASAP 2020 Plus. $^1$H-NMR spectra were obtained with a Bruker DPX-300 NMR spectrometer equipped with a broad-band optimized BBO probe operating a frequency of 300.13 MHz and referenced against TMS. All NMR spectra were recorded with Bruker Topspin (version 3.5 p17) software. All NMR experiments were performed at 25° C. The phosphorus profile of the materials was determined using a Hitachi Model S4800 field emission scanning electron microscope (SEM) with an energy dispersive x-ray spectrometer (EDX). SEM-EDX experiments were performed on the [DMEA][HCOO] resins loaded with 10% (% w/w) HDEHP. To mount the sorbents in the SEM column, a cylindrical graphite pole was used. One end of the pole was formed into the shape of a trapezium, on which two-ton adhesive from Devcon (Danvers, Mass.) was applied and allowed to dry for ~30 minutes. The resin was then sprinkled on top of the trapezium and allowed to settle overnight. The following day, the resin-adhesive surface was cut in half to expose the bead interior, thereby permitting examination of the cross-section of the bead under SEM. The exposed interior was then carbon-coated to ensure surface conductivity.

Example 2

Methods

SPP Resin Preparation. Beads of pure Amberchrom CG-71m or Pre-filter resin were slurried with methanol and then mixed with the desired amount of filler as a solution in methanol. The mixtures were then shaken for 24 hours, after which the methanol was removed using rotary evaporation at 55° C. under vacuum (dry impregnation) to yield the filler-loaded sorbent. $C_{12}mim^+Tf_2N^-$, $P_{66614}^+Tf_2N^-$, $P_{66614}^+BF_4^-$, $C_{12}mim^+BF_4^-$, eicosane, DIMCARB, and [DMEA][HCOO] were loaded to the full available volume of the resin. In addition, a series of other resins were prepared in which the support was filled to various levels. For example, support was filled with $C_{16}mim^+Tf_2N^-$ to a volume fraction of 0.80. Similarly, the support was filled with either PTHF 250 or cetyl alcohol to a fraction of 0.30 of the total volume. Lastly, 1-dodecanol was used to fill the support to a volume fraction of 0.15. For surface area determinations, HDEHP, PTHF 250, $P_{66614}^+Cl^-$, and $C_2mim^+Tf_2N^-$ were loaded to various loading levels.

Addition of HDEHP to impregnated resins. Beads of Amberchrom CG-71m beads or Pre-filter material (filled to 0.15 volume fraction with 1-dodecanol) were slowly added to a small volume of HDEHP-methanol solution. The methanol was then quickly dried by rotary evaporation at 55° C. with vacuum. Pre-filter material was also loaded to 10% (% w/w) with HDEHP only, also using rotary evaporation at 55° C. with vacuum. Amberchrom CG-71m was used to prepare the remaining resins.

Determination of Weight Distribution Ratios. Solid-liquid (weight) distribution ratios ($D_w$) for $Eu^{3+}$ were measured radiometrically using $^{152/154}Eu^{3+}$ radiotracer. For $Nd^{3+}$ and $Gd^{3+}$, inactive neodymium (III) nitrate hexahydrate and gadolinium (III) nitrate hexahydrate solutions were quantified using ICP-MS. Specifically, the uptake of each radiotracer or inactive metal ion from a series of nitric acid solutions by the resins was measured by contacting a known volume (mL) of $^{152/154}$Eu-spiked or Gd$^{3+}$- or Nd$^{3+}$-spiked acid solutions of appropriate concentration with a known quantity of resin (20-25 mg). The ratio of the aqueous phase volume (mL) to the weight of the chromatographic material (in grams) typically ranged from 40-50. This ratio generally produces an easily measured decrease in the aqueous phase activity or concentration upon contact with the resin. A two-hour contact time was used for equilibration. Following equilibration, an aliquot of aqueous phase was withdrawn from each culture tube and the activity counted or concentration measured.

From the counts or metal ion concentration present in the aqueous phase both before and after contact with the resins, the weight distribution ratios ($D_w$) of $^{152/154}$Eu$^{3+}$, Nd$^{3+}$, and Gd$^{3+}$ were calculated by using Eqn. 2:

$$D_w = [(A_0 - A_f)/A_f](V/w) \quad (2)$$

where $A_0$ and $A_f$ are the aqueous phase activity (cpm) or concentration before and after equilibration, respectively, w is the mass (g) of the resin, and V is the volume of the aqueous phase (mL).

Capacity of the resins. In this work, a solution of cold europium (III) nitrate hexahydrate in dilute nitric acid containing five times the stoichiometric amount of extractant present was prepared and spiked with $^{152/154}$Eu$^{3+}$ radiotracer. Each resin was weighed (20-25 mg) into separate test tubes and contacted with 1 mL of this radiotracer solution. After mixing, samples were equilibrated for 24 hours, far longer than the time required for equilibrium. The acid concentration chosen was such that a distribution ratio of 300-400 (corresponding to >99% extraction) was obtained. After equilibration, the aqueous phase was withdrawn and filtered through a fritted plastic column. Assuming the fraction of inactive europium corresponds to the fraction of $^{152/154}$Eu$^{3+}$ sorbed, then the capacity of the sorbent (mg Eu/g of sorbent) can be calculated. Data was obtained for the 10-30% (w/w) HDEHP resins and the commercial resin (40% (w/w) HDEHP).

Column preparation and characterization. To pack a column, a small quantity of the resin was slurried in 18 MΩ-cm MilliPore water and transferred to the column. Packing was carried out under flow of gravity. When the resin bed reached the desired height, a small plug of glass wool was added so that the bed would not be disturbed upon sample introduction. Prior to sample introduction, the column was preconditioned with 10 free column volumes (FCVs) of the desired nitric acid solution. Unless otherwise noted, all column runs utilizing 50-100 μm particles carried out as part of studies of the effects of support loading with pore-blocked resins were performed without applied pressure, corresponding to a flow rate of 1.39±0.08 mL/min·cm$^2$. No systematic changes in gravity flow rates were noted upon changes in the level of support loading. All small particle size (20-50 μm) runs were carried out at a flow rate of 1.50±0.05 mL/cm$^2$·min with applied pressure.

The bed density, resin density, stationary phase volume ($v_s$, the volume of liquid extractant contained in the pores of the support), and mobile phase volume ($v_m$, the free column volume) were determined using the following methods. Specifically, the bed density was determined for bed volumes of 0.9 mL and 1.9 mL for the 1- and 2-mL columns, respectively. The resin density was calculated by adding a small quantity of resin to solutions of nitric acid of known density. The resin density matched that of the nitric acid solution when it remained suspended after mixing. The stationary phase volume was calculated from the resin mass, the extractant loading (% w/w), and the extractant density. The mobile phase volume was determined by first equilibrating the column with a concentrated (~1 M) nitric acid solution of known density. A small volume (~5 μL) of $^{137}$Cs$^+$ was then added to the top of the bed. As HDEHP extracts a negligible amount of this monovalent cation, it elutes through the column unretained (McDowell, 1971. *Journal of Inorganic and Nuclear Chemistry*, 33, 1067-1079). Individual drops of acid were collected and counted. From the average drop volume and the number of the drop in which cesium nitrate is first detected, and the total elution volume, which corresponds to the mobile phase volume, was determined. All runs were carried out at ambient temperature (23±2° C.).

Elution curves of Europium for resin characterization. The elution profile of europium on packed beds of both 20% (w/w) HDHEP-SPP material and 40% (w/w) HDEHP-loaded conventional Ln-resin was determined employing Bio-Rad Econocolumns using HNO$_3$ as the eluent. The characteristics of the packed columns were determined prior to the experiment following the procedures outlined above. For SPP materials, a solution 0.16 M HNO$_3$ was used as the eluent, while a solution of 0.30 M HNO$_3$ was used with the conventional material. After conditioning the columns with the appropriate eluents, a small quantity (~10 μL) of $^{152}$Eu in 0.05 M HNO$_3$ was introduced at the top of the bed and then eluted with appropriate nitric acids. Samples of the eluent were collected at various intervals and y counted. The columns were subjected to slight pressure applied using the bulb of a Pasteur pipette, yielding a flow rate of ~2-3 ml/cm$^2$ min. All runs were carried out at ambient temperature (23-25° C.).

Figure 25:
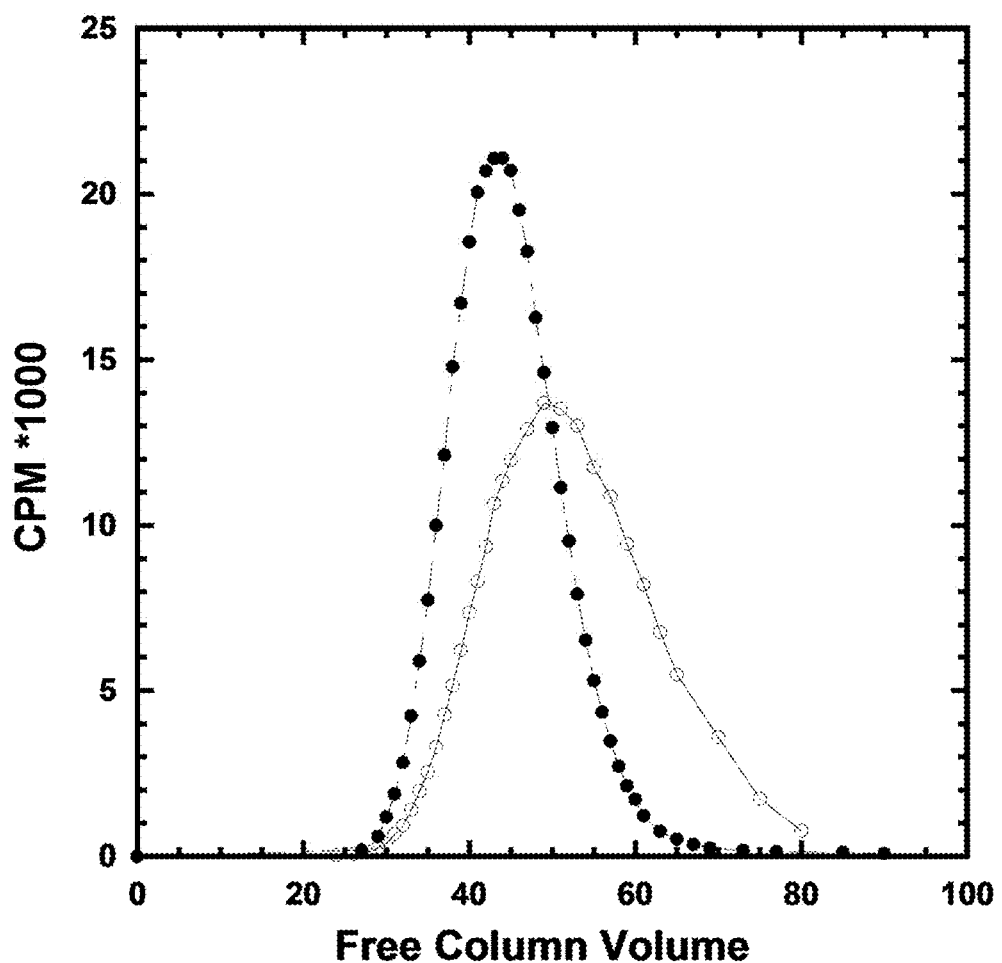
FIG. 25 shows a comparison of the elution profile of Eu-152 on a conventional lanthanide-selective EXC resin (open circles) and on an analogous surface-porous material (filled circles). Eluent: 0.30 M $HNO_3$ for the conventional Ln-resin and 0.16 M $HNO_3$ for the surface-porous resin; flow rate: 2-3 mL/$cm^2$/minute; temperature: ~23° C. Column efficiency: N=17 plates for conventional material; N=43 plates for surface-porous (PPG-400 filled) material.
Figure 26:
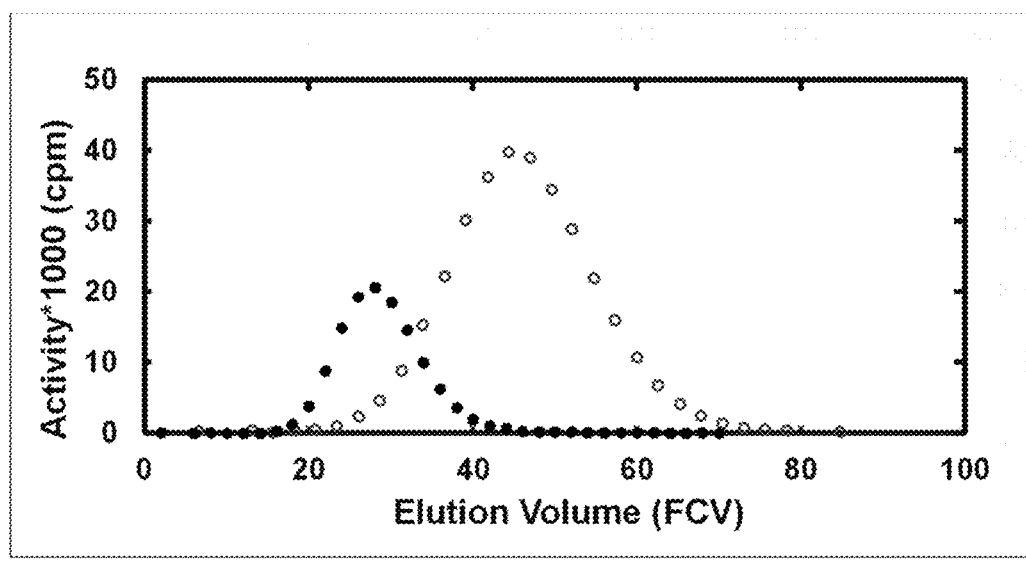
FIG. 26 shows a comparison of the elution profile of Eu-152 on a commercial HDEHP-based, lanthanide-selective EXC resin (open circles; N=24; $T_f$=1.40) and on an analogous resin modified to block its least accessible pores with 1-dodecanol (filled circles; N=33; $T_f$=1.18). $V_{column}$=2.0 mL; resin particle size=50-100 μm; flow rate=1-2 mL $cm^{-2}$ $min^{-2}$.

To determine the effect of the differing distribution of the extractant within the beads on the chromatographic efficiency of the two sorbents (conventional Ln resin and the SPP material) the elution profile of Eu$^{3+}$-152/4 was obtained for columns of both resins. So that the band spreading of the elution curves could be compared at similar values of k' (i.e., the number of free column volumes to peak maximum), the acidity of the eluents used was adjusted. FIG. 25 depicts the elution profiles obtained using the two sorbents. As can be seen, the elution band is clearly narrower for the SPP resin, consistent with higher column efficiency. The number of theoretical plates (N), a quantitative measure of this efficiency, is 17 and 43, respectively, for the Ln-resin and the SPP resin. From N, another measure of efficiency, the height equivalent of a theoretical plate (HETP), can be calculated as 2.35 mm and 0.93 mm, respectively, for the Ln-resin and the SPP material. These parameters imply that the efficiency of the SPP material is ca. 2.5 times that of the regular Ln-resin.

Figure 10:
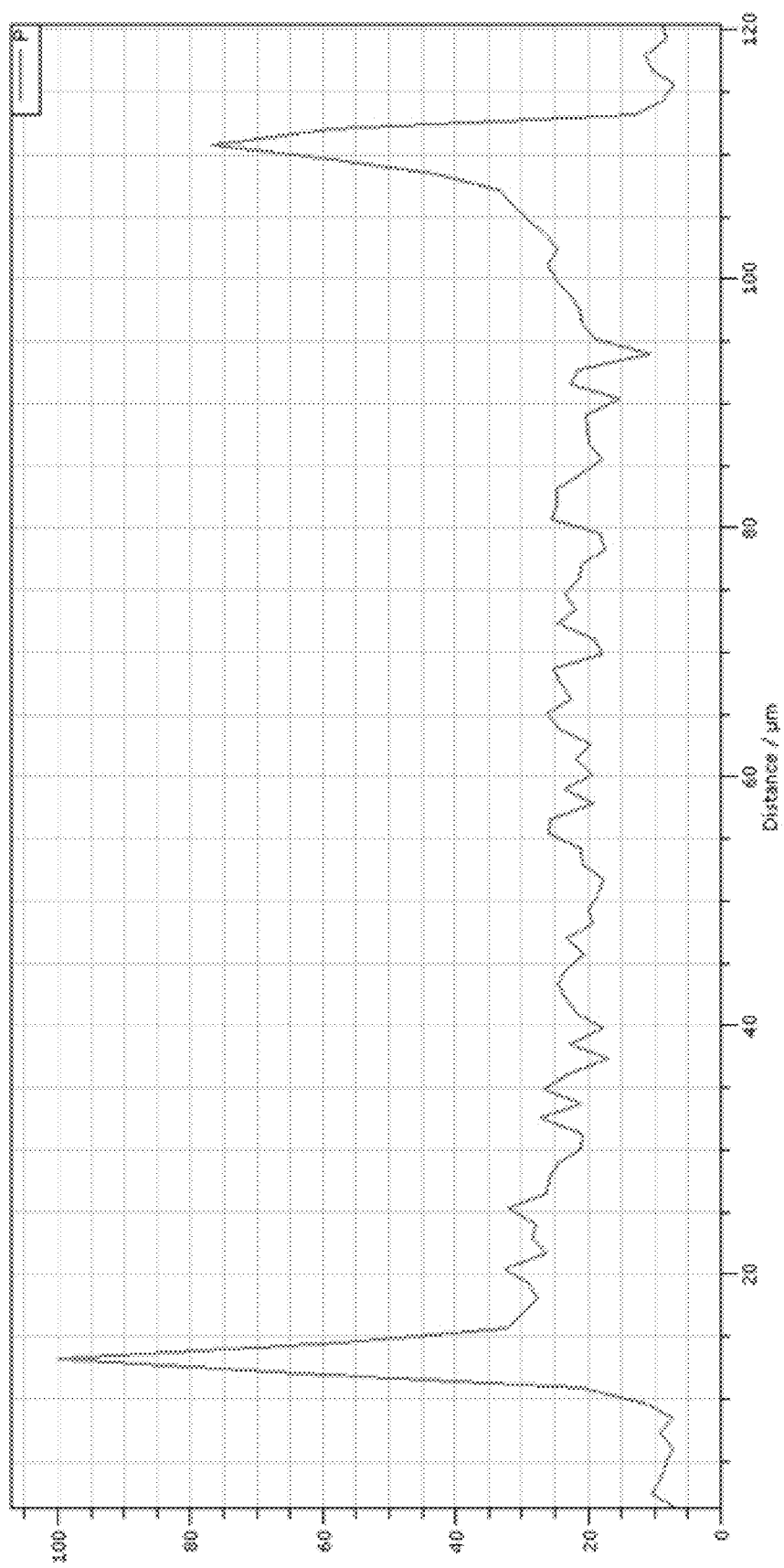
FIG. 10 shows an SEM-EDX image showing the distribution of HDEHP using Amberchrom CG-71m with its interior filled with PPG-400 and impregnated with 20% (% w/w) HDEHP, demonstrating surface confinement of the HDEHP.

Elution curves of $^{152/154}$Eu$^{3+}$ for resin characterization. The elution profiles of $^{152/154}$Eu$^{3+}$ on packed beds of resin comprising Amberchrom CG-71m filled to 0.15 volume fraction filled with 1-dodecanol and loaded to 5, 10, 15, 20, and 30% (w/w) HDEHP were determined using BioRad Econo-Columns (0.5×5 cm or 0.5×10 cm) using dilute HNO$_3$ as the eluent. Column characteristics (TABLE 1) were determined prior to elution experiments using the procedures outlined above. For the 5, 10, 15, 20, and 30% resins and the commercial Ln (40% w/w) resin, 0.0257 M, 0.045 M, 0.086 M, 0.097 M, 0.17 M HNO$_3$ and 0.30 M HNO$_3$ were used as the eluents, respectively. Eluent volumes of two FCVs were collected, with 100 μL of each subsequently sampled for gamma counting. The theoretical plate count (N) and height (H), tailing factor ($T_f$), peak asymmetry ($A_s$), and resolution (when a second ion is present) were calculated from the resultant elution plots according to Equations 3, 4, 5, 6, and 7 respectively.

$$N = 5.54 * \left(\frac{V_R}{W_{0.5h}}\right)^2 \quad (3)$$

$$H = \frac{L}{N} \quad (4)$$

$$T_f = \frac{a}{2b} \quad (5)$$

$$A_s = \frac{c}{d} \quad (6)$$

$$R_s = 2(V_{R2} - V_{R1})/(w_{b1} + w_{b2}) \quad (7)$$

where $V_R$ is the number of FCVs at which the metal ion concentration reaches a maximum, $w_{0.5\,h}$ is the peak width at half-height, L is the column length, a is the full peak width and b is the front half-width at 5% of the peak height, c is the width of the front half of the peak and d is the width of the back half of the peak at 10% of the peak height, and $R_s$ is the chromatographic peak resolution, $V_R$ is the retention time, and $w_b$ is the peak width at baseline.

porous region is confined largely to the near-surface areas of the support beads. In this work, polypropylene glycol (PPG) 400 was used as the filler, and completely-filled PPG 400 beads were stripped with hexanes. Because the support is hydrophilic while hexane is hydrophobic, it would be expected that hexane would not be able to penetrate the interior of the support. Thus, the PPG 400 filler should be stripped only from the outermost regions of the filled support. Indeed, this was observed. The near-surface space once occupied by the PPG 400 was then filled with HDEHP to a loading level of ~20% (w/w). Concerns over interaction between PPG 400 and HDEHP was assuaged by SEM-EDX analysis, which showed that phosphorus (i.e., the extractant) was present only in the near-surface regions of the impregnated support (FIG. 10). Thus, even though PPG 400 and HDEHP are completely miscible, they are not interacting within the support. Also, minimal loss of filler due to its water-miscibility was observed, as apparently the filler is not exposed to the aqueous elution solvent. Finally, the resulting extraction efficiency substantially increased (N=43) compared to that of EiChrom Ln resin (N=25).

SPP materials impregnated with HDEHP were examined by energy dispersive X-ray analysis (SEM-EDX) to determine the distribution of the phosphorus (and thus, extractant) in the bead. It was anticipated that filler removed in the stripping step would come from the periphery of the beads,

TABLE 1

Characteristics of prepared and commercial Ln resins and packed columns

| Bulk Materials 1-dodecanol used | 5% HDEHP-loaded SPP resin | 10% HDEHP-loaded SPP resin | 10% HDEHP-loaded SPP resin | 15% HDEHP-loaded SPP resin | 20% HDEHP-loaded SPP resin | 30% HDEHP-loaded SPP resin | Ln resin (40% HDEHP) |
|---|---|---|---|---|---|---|---|
| Stationary Phase Support | HDEHP Amberchrom CG-71m | HDEHP Amberchrom CG-71m | HDEHP EiChrom Pre-filter | HDEHP Amberchrom CG-71m | HDEHP Amberchrom CG-71m | HDEHP Amberchrom CG-71m | HDEHP Amberchrom CG-71m |
| Particle Diameter | 75 μm | 75 μm | 35 μm | 75 μm | 75 μm | 75 μm | 75 μm |
| Extractant Loading | 5% | 10% | 10% | 15% | 20% | 30% | 40% |
| Density of extractant-loaded beads | 1.17 | 1.13 | 1.21 | 1.12 | 1.12 | 1.11 | 1.14 |
| Packed columns | | | | | | | |
| $V_s$, mL/mL of bed | 0.01324 | 0.02829 | 0.06383 | 0.04519 | 0.05059 | 0.09815 | 0.15 |
| Bed Density (g/mL) | 0.2840 | 0.3033 | 0.3422 | 0.3230 | 0.2712 | 0.3898 | 0.36 |
| Vm, mL/mL of bed (also FCV) | 0.672 | 0.690 | 1.14 | 0.694 | 0.686 | 0.663 | 0.69 |
| Vs/Vm | 0.020 | 0.041 | 0.056 | 0.065 | 0.074 | 0.148 | 0.217 |
| Capacity, mg Eu/ mL of bed | N/A | 3.50 | N/A | 5.10 | 6.25 | 14.35 | 11.04 |

Elution curves of cold $Eu^{3+}$, $Nd^{3+}$, and $Gd^{3+}$. After column conditioning with designated eluents as described above, ~10 μL each of solutions of $Eu^{3+}$ (2.5 mM), $Nd^{3+}$ (2.3 mM), and $Gd^{3+}$ (2.5 mM) were introduced at the top of the column, depending on the separation, and eluted using the appropriate acid. The eluent was collected in 1-2 FCV fractions and assayed using the ICP-MS. All runs were carried out at ambient temperature (23±2° C.).

Example 3

Results

Figure 9:
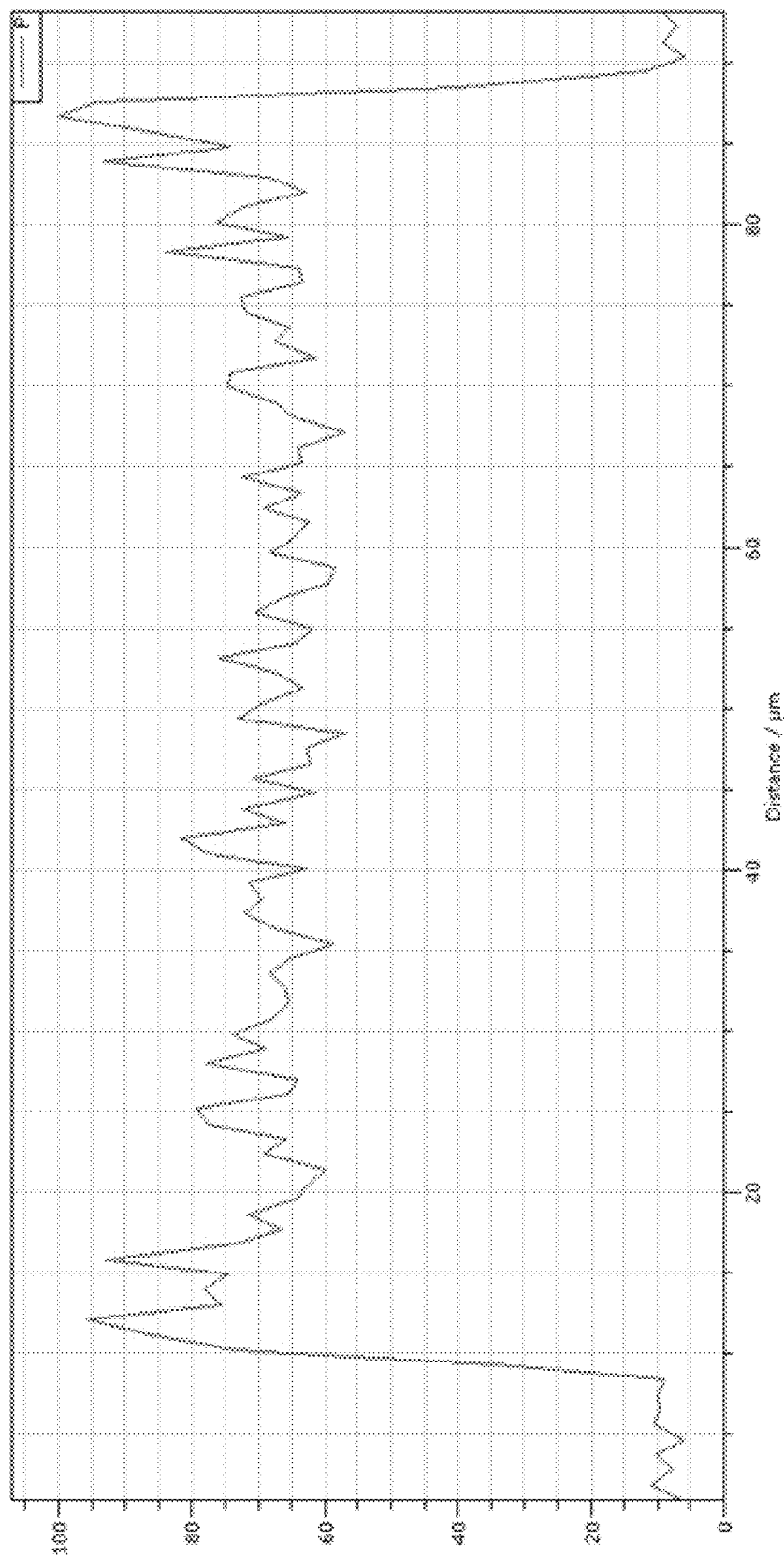
FIG. 9 shows an SEM-EDX image showing the distribution of an organophosphorus extractant (HDEHP) in a conventional EXC support (Amberchrom CG-71m).

In initial experiments, so-called "outside-in stripping" was carried out in an effort to prepare a support whose so that the HDEHP would reside in the near-surface regions. Phosphorus profiles were obtained for a conventional Amberchrom CG-71 resin loaded to 40% (w/w) with HDEHP (FIG. 9) and 20% HDEHP-loaded SPP materials (FIG. 10). Phosphorus (and thus, HDEHP) is present throughout the entirety of the conventional resin, but is confined to the outer edges in the SPP material.

Figure 11:
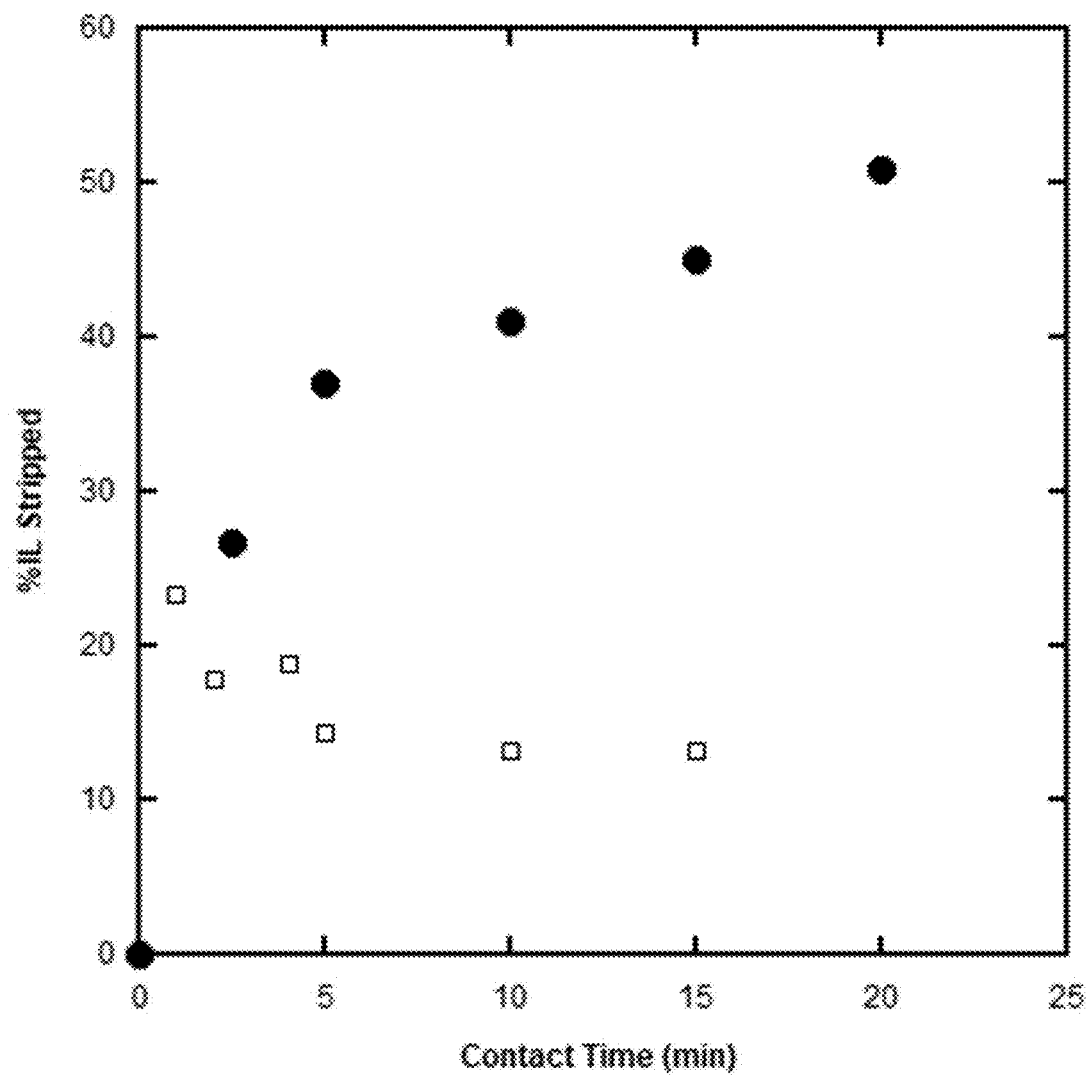
FIG. 11 shows stripping of ionic liquid from a $C_{12}mimTf_2N$-impregnated resin as a function of contact time with an ethanol (12% v/v) solution in hexane.

Other fillers, stripping solvents, and stripping protocols were also examined. As a first step in these studies, the suitability of ionic liquids as fillers was examined. In principle, their extraordinary tunability could make them useful in this application. In particular, $C_n mimTf_2N$ ILs are water-insoluble and their viscosity equals or exceeds that of PPG 400, thus minimizing potential interaction with HDEHP. Unfortunately, these ILs are hexane-immiscible, and thus require a more polar solvent to strip. With this in mind, various ethanol-hexane mixtures were employed to strip a resin containing $C_n mim^+ Tf_2 N^-$ ILs as the filler. FIG. 11 shows the results obtained for two trials in which beads loaded with $C_{12} mim^+ Tf_2 N^-$ were stripped with a 12% (v/v) ethanol in hexane solution. As can be seen, the amount of filler stripped increased as a function of contact time for one trial (as expected), but inexplicably decreased during a second trial with an identically prepared set of beads. To determine if this irreproducible behavior is simply a characteristic of $C_{12} mim^+ Tf_2 N^-$, several other ILs—$P_{66614}^+ Tf_2 N^-$, $P_{66614}^+ BF_4^-$, and $C_{12} mim^+ BF_4^-$— were next evaluated using the same bead preparation and stripping procedure. Unfortunately, the resins prepared using either $P_{66614}^+ Tf_2 N^-$ or $P_{66614}^+ BF_4^-$ as the filler floated, making them impractical. Along these same lines, $C_{12} mim^+ BF_4^-$-loaded resin was found to be physically unstable, as the IL readily leached from it upon passage of aqueous phase.

These results led us to revisit a hexane-miscible filler. This time, however, a filler was sought that would solidify in the pores of the support, thereby minimizing any possible interaction with the extractant. Eicosane ($C_{20}H_{42}$), a waxy material at room temperature, was therefore evaluated as a filler. Unfortunately, eicosane deposited largely on the exterior of the beads rather than in the pores. Apparently, it is simply too hydrophobic to be taken into the interior of such a hydrophilic resin.

Figure 12:
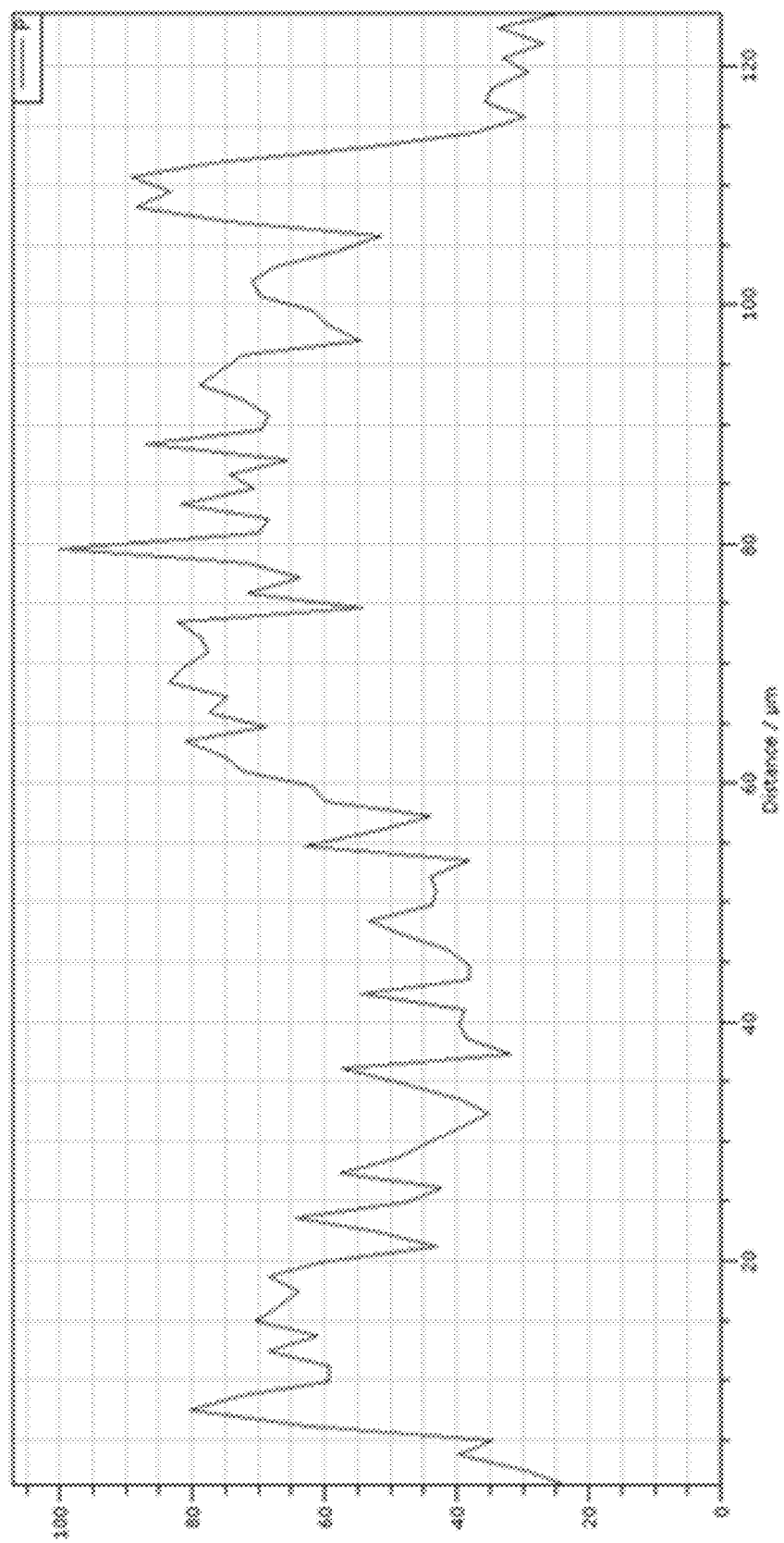
FIG. 12 shows the phosphorus profile obtained using SEM-EDX [DHEA][HCOO] resin impregnated with 10% (% w/w) HDEHP.

Distillable ionic liquids (DILs) were next considered as fillers. In contrast to conventional fillers, which require a strip solution for their removal, beads impregnated with DILs can be stripped using only heat and reduced pressure, such as can be achieved with a rotary evaporator. Of course, this approach will work only if the filler does not evaporate with the impregnation solvent. Unfortunately, even with an easily evaporated impregnation solvent, methylene chloride (boiling point=39.6° C. at ambient pressure), the first distillable IL used, dimethylammonium dimethyl carbamate (DIMCARB; boiling point=60° C. at ambient pressure) co-evaporated, and therefore could not be used further. The second distillable IL used, N,N-dimethylethanolammonium formate, had greater thermal stability than DIMCARB, and did not co-evaporate with the $CH_2 Cl_2$ during support impregnation. Unfortunately, following the addition of HDEHP, SEM-EDX analysis showed that phosphorus is distributed throughout the bead, rather than being confined to the near-surface regions (FIG. 12). Because this and our other attempts at the "outside-in" approach to support preparation did not yield the desired results, alternate methods of resin preparation were pursued.

Figure 13:
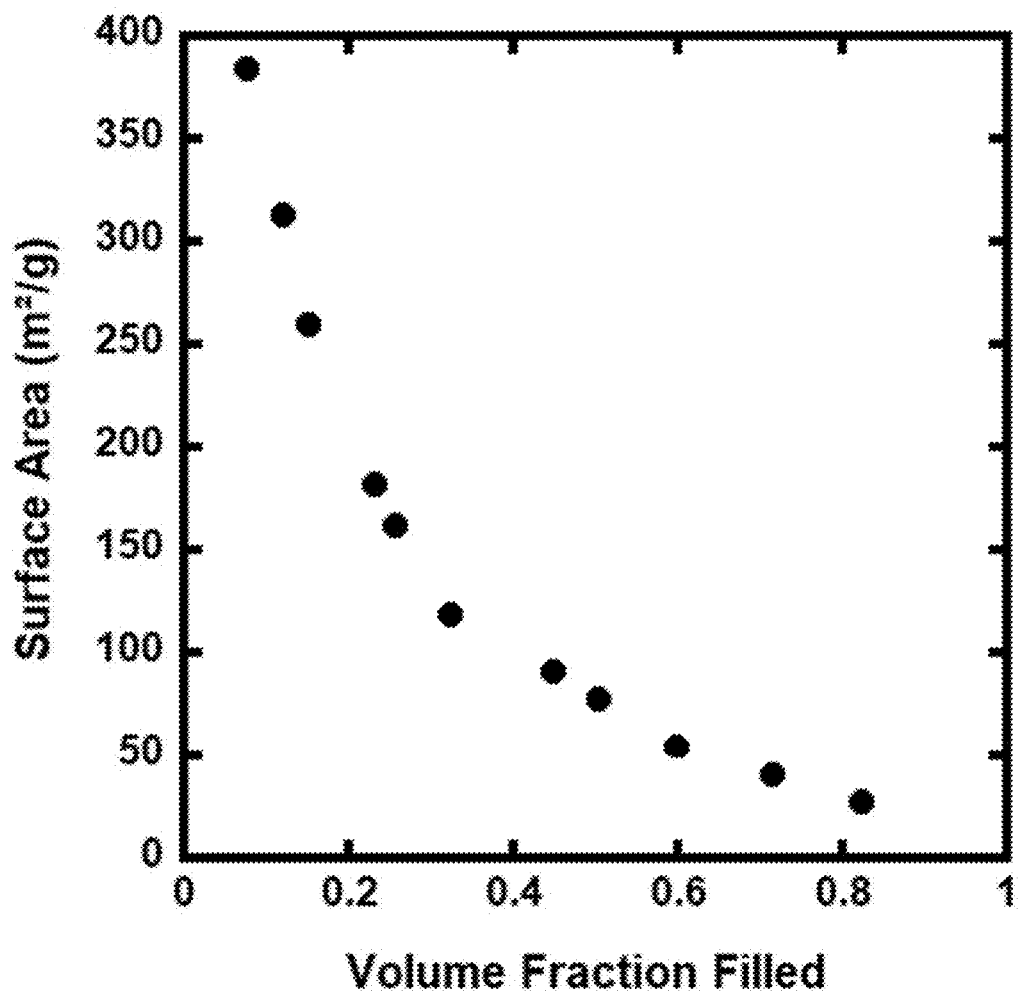
FIG. 13 shows the relationship between surface Area ($m^2$/g) and volume fraction filled of PTHF 250-impregnated resins.

The pore structure of commercial solid supports such as Amberchrom CG-71m is complex. Despite this, surface area measurements carried out at various levels of impregnation enable one to determine where the various types of pores present become filled. As shown in FIG. 13, which depicts the effect of PTHF 250 impregnation on the surface area of Amberchrom CG-71m, two points at which the slope changes are readily evident. These correspond to a loading level at which the smallest pores are essentially filled (0.18), while the second (0.30) corresponds to the filling of the intermediate pores. As an alternative to the "outside-in" method of achieving a readily accessible layer of extractant, at this point an "inside-out" approach, in which extractant would be deposited atop a quantity of filler placed in the least accessible, deep interior pores was investigated.

In our initial experiment, the empty support was filled to a loading level of 0.30. Unexpectedly, significant loss of this PTHF 250 was observed when it was topped with HDEHP and the resultant resin subjected to water rinsing. In fact, using either a gravimetric method or $^1$H-NMR indicates that ca. 89% of the filler initially present was lost during column preconditioning. Water-immiscible ionic liquids (ILs), specifically short-chain, imidazolium-based ILs (as they have ≤5 mM HDEHP solubility) were therefore evaluated. $C_2 mim^+ Tf_2 N^-$ was thought to be a proper choice, but upon resin preparation and column preconditioning, a significant amount of a water-immiscible liquid, determined by $^1$H NMR to be the IL, was observed to have leached from the column. It is important to note that although this IL is often regarded as water-immiscible, only a few milligrams are present on the column while over 100 mL of aqueous solution are added during the column preparation, preconditioning, and elution process.

Figure 14:
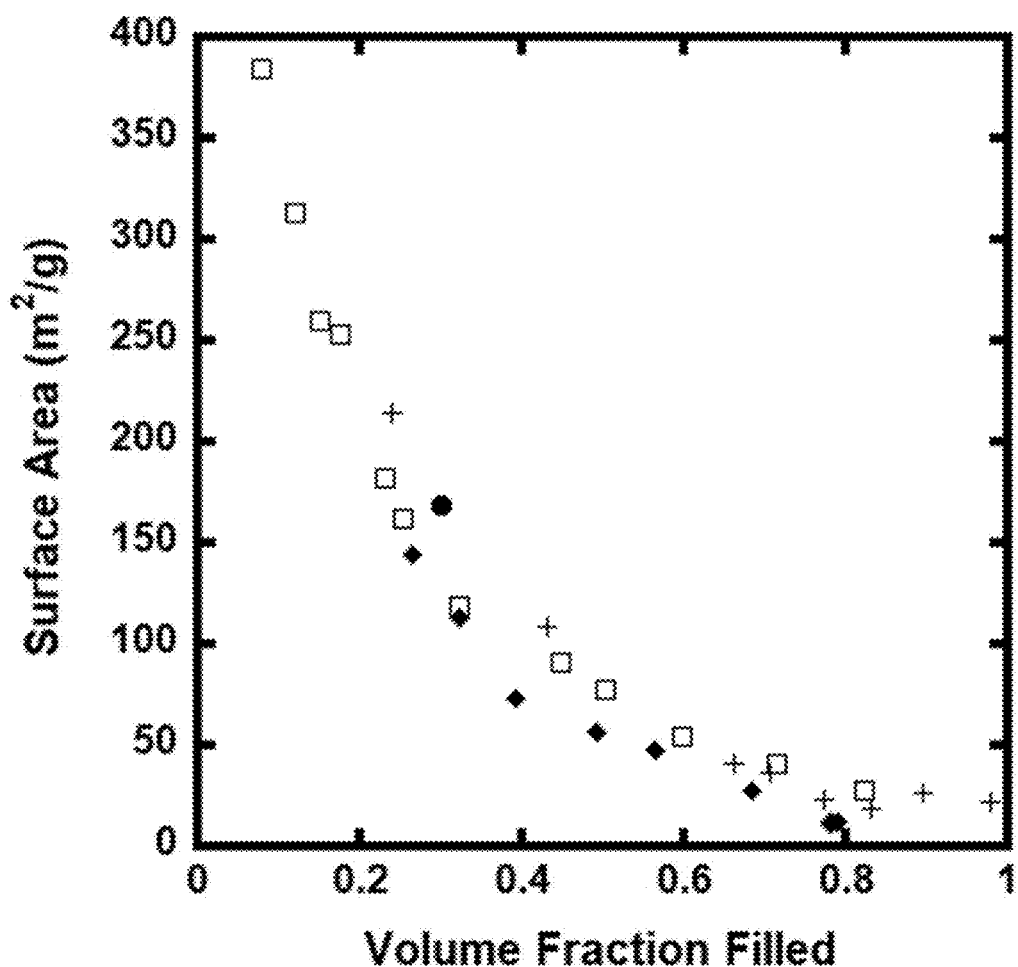
FIG. 14 shows the relationship between surface Area ($m^2$/g) and volume fraction filled of PTHF 250-($\square$), $C_2mim^+Tf_2N^-$ ($\boxplus$), $P_{666,14}^+Cl^-$ (+), and Cetyl Alcohol ($\bullet$)-impregnated resins.

Up to this point, it was known that water-immiscibility and support compatibility were the two most important factors in choosing a filler, but the importance of another factor soon became evident. From FIG. 14, it can be seen that for a given level of support loading, $P_{666,14}^+ Cl^-$ yields a higher measured surface area than either PTHF 250 or $C_2 mim^+ Tf_2 N^-$. As shown in TABLE 2, the viscosity of $P_{666,14}^+ Cl^-$ is significantly higher than that of the other two fillers. Apparently, this high viscosity limits access of the filler into the smallest pores of the support. The next filler tested, cetyl alcohol, is water-immiscible, and should be compatible with the support given its hydroxyl functional group. Although it is a solid at room temperature, if heated to 55° C., it is a liquid with a viscosity of only 9.3 cP, less than that of either PTHF 250 or $C_2 mim^+ Tf_2 N^-$ at room temperature. This particular filler loaded to a volume fraction level of 0.30 had a surface area not in agreement (FIG. 14) with that of either $C_2 mim^+ Tf_2 N^-$ or PTHF 250.

TABLE 2

| Viscosity of Select Fillers at 25° C. | |
| --- | --- |
| Filler | Viscosity at 25° C. (cP) |
| PTHF 250 | 158 |
| $C_2 mim^+ Tf_2 N^-$ | 33 |
| $P_{666,14}^+ Cl^-$ | 1824 |

Figure 15:
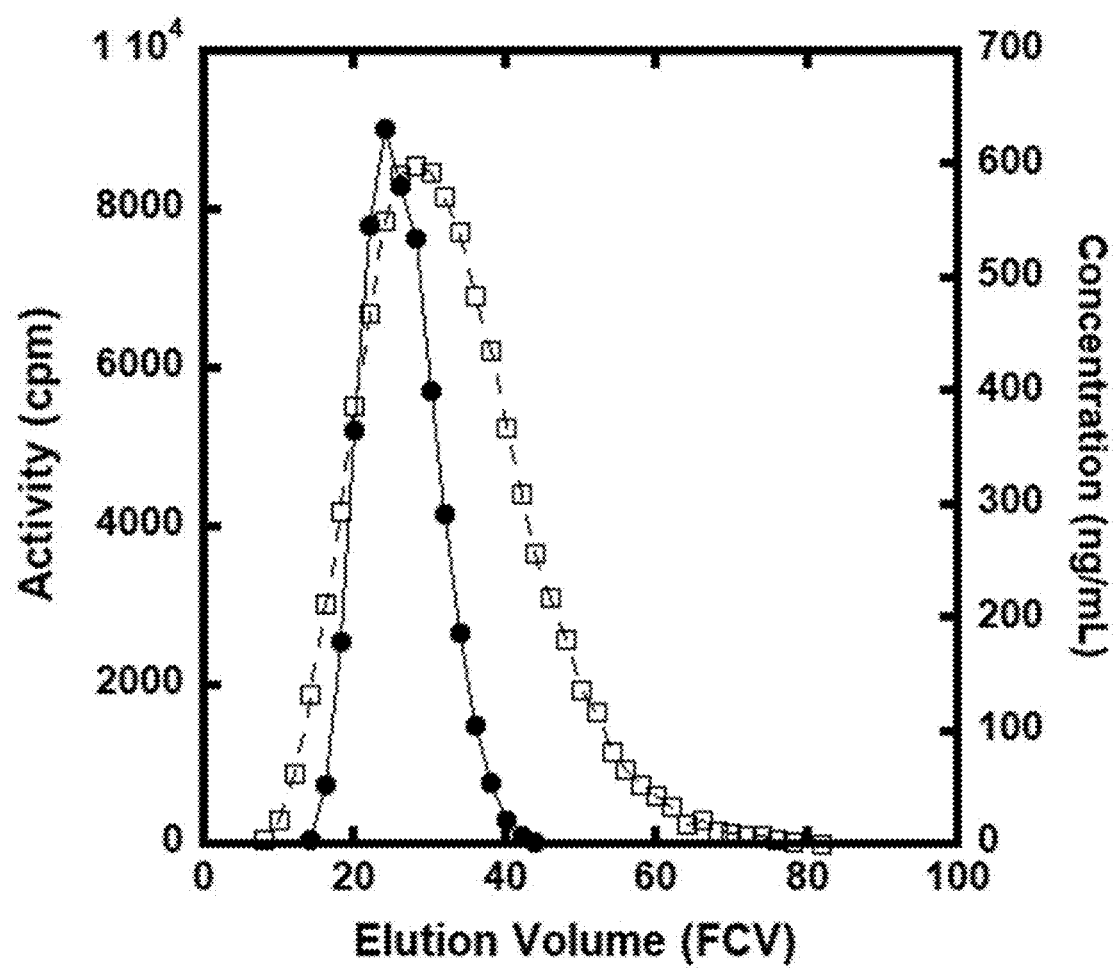
FIG. 15 shows $C_{16}mim^+Tf_2N^-$-impregnated, 10% (% w/w) HDEHP ($\square$, cpm) (Eluent: 0.608 M $HNO_3$, Flow Rate=1.38±0.02 mL/min.·$cm^2$, T=23±2° C., 0.9 mL bed volume) and commercial Ln ($\bullet$, concentration (ng/mL)) resins (Eluent: 0.30 M $HNO_3$ T=23±2° C., 0.9 mL bed volume) $^{152/4}Eu^{3+}$Elution Profile.

FIG. 13 also appears to show that regardless of filler viscosity or polarity, filling the support to near capacity (~80% of the available volume) yields much the same surface area. With this in mind, $C_{16} mim^+ Tf_2 N^-$ was evaluated next, as such a long-chain IL will be much less water soluble than any of the other ILs used. As hoped, loading the support to a volume fraction of 0.80 with the IL, then flushing a column (1 mL) packed with the sorbent with water (40 mL or 40 bed volumes) resulted in no detectable $C_{16} mim^+ Tf_2 N^-$ leaching from the support. As shown by FIG. 15, 10% (% w/w) HDEHP loading of a $C_{16} mim^+ Tf_2 N^-$-filled support did not yield a greater column efficiency (N=8) compared to the commercial Ln resin (N=24).

Figure 16A:
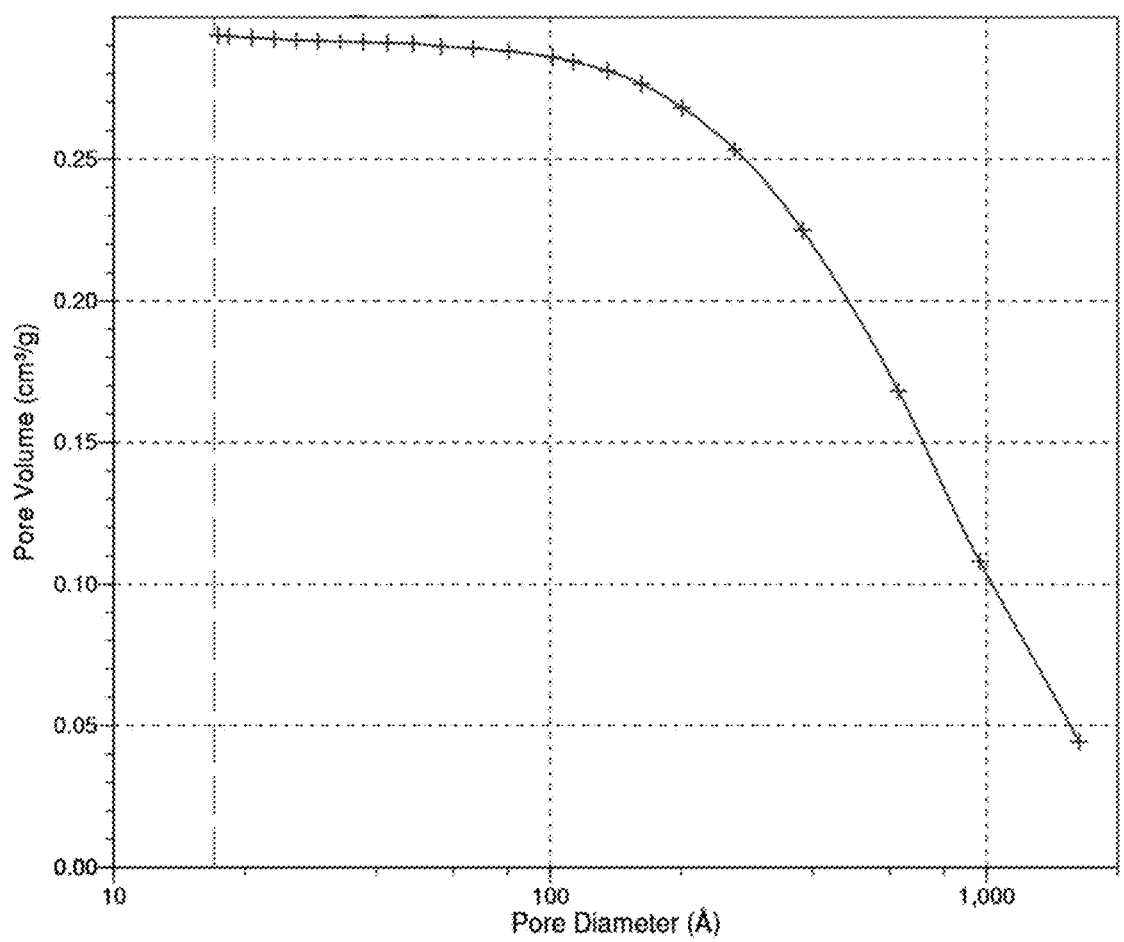
FIG. 16 shows pore distribution of $C_{16}mim^+Tf_2N^-$- (FIG. 16A) and $C_2mim^+Tf_2N^-$ (FIG. 16B)-impregnated supports. 80% of the available resin volume is filled for both resins.
Figure 16B:
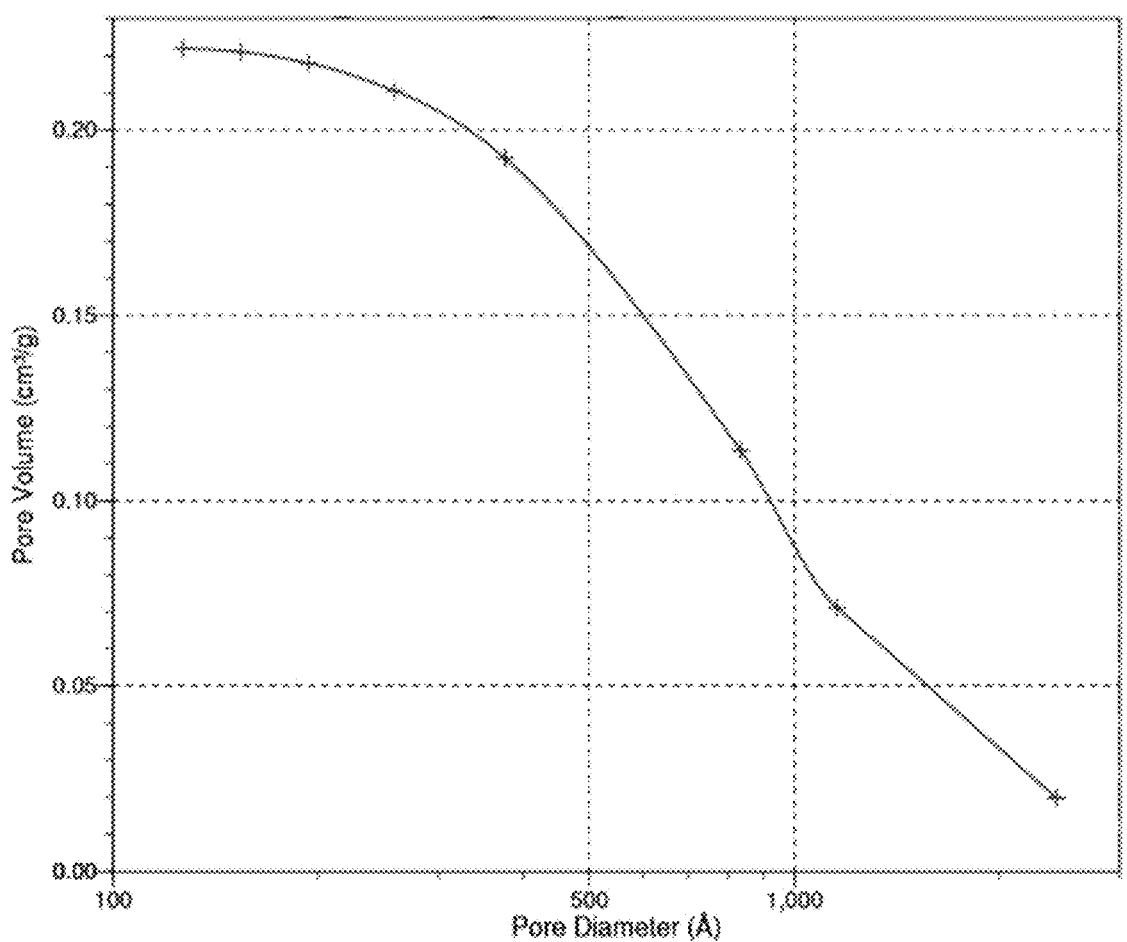

Published data on the size of various $C_n mim^+ Tf_2 N^-$ ILs were extrapolated to estimate the diameter of $C_{16} mim^+ Tf_2 N^-$ (0.801 nm) and $C_2 mim^+ Tf_2 N^-$ (0.629 nm) (Tokuda et al., 2005. *Journal of Physical Chemistry B*, 109, 6103-6110). Published surface area data on Amberlite XAD-7, the large particle analog of Amberchrom CG-71m, shows the presence of pores with diameters less than that of $C_{16} mim^+ Tf_2 N^-$ (Yang et al., 2006. *Science in China, Series B: Chemistry*, 49, 445-453). Accordingly, it would be expected that its use as a filler would leave small pores unfilled. Indeed, as can be seen from FIG. 16A and FIG. 16B, which compares the pore distribution of $C_2mim^+Tf_2N^-$- and $C_{16}mim^+Tf_2N^-$-filled resins (filled to a volume fraction of 0.80), pores of less than 0.801 nm are present in the $C_{16}mim^+Tf_2N^-$-loaded resin. In contrast, for $C_2mim^+Tf_2N^-$, no pores below 10 nm in diameter are present, proving that the smallest pores are completely filled with the smaller IL.

To gain further insight into the nature of the support interior, thus providing information to guide additional studies of fillers, the column efficiencies of 10, 15, 20 and 30% (w/w) HDEHP resins were considered. As shown by the theoretical plate counts (N) in TABLE 3, nothing is gained by operating at loading levels ≤15% (% w/w) HDEHP. However, the 20% (% w/w) HDEHP resin shows an increase in theoretical plate count. Surface area analysis (FIG. 17) of the same resin indicates that the majority of the HDEHP is consumed in complete filling of the micropores of the support. What remains is probably present as a thin layer on the walls of the intermediate pores as evidenced by the increase in column efficiency. For resin loaded with 30% (w/w) HDEHP, a similar explanation is appropriate. That is, based on surface area data, at this level of loading, nearly all of the intermediate pores of the resin have been filled, leaving the remaining HDEHP on the surface of the large pores. However, while a layer of HDEHP on the walls of the intermediate pores produces a gain in column efficiency, an analogous layer present on the walls of the macropores, does not provide a comparable efficiency gain.

TABLE 3

Effect of support loading on the elution behavior of Eu(III) on Amberchrom CG-71m—supported HDEHP

| Support loading (% w/w) | $T_f$ | $A_s$ | H (cm) | N | Capacity (mg Eu/mL bed) |
|---|---|---|---|---|---|
| 10 | 1.67 | 2.21 | 0.239 | 20 | 1.25 |
| 15 | 1.36 | 1.47 | 0.239 | 20 | 1.94 |
| 20 | 1.11 | 1.14 | 0.140 | 33 | 3.81 |
| 30 | 1.24 | 1.40 | 0.191 | 25 | 10.28 |
| 40 | 1.36 | 1.74 | 0.199 | 24 | 11.04 |

Experimental conditions: $V_{column}$ = 0.90 mL; $L_{column}$ = 4.77 cm; Flow rate: 1.57 ± 0.12 mL/cm² · min.

Figure 17:
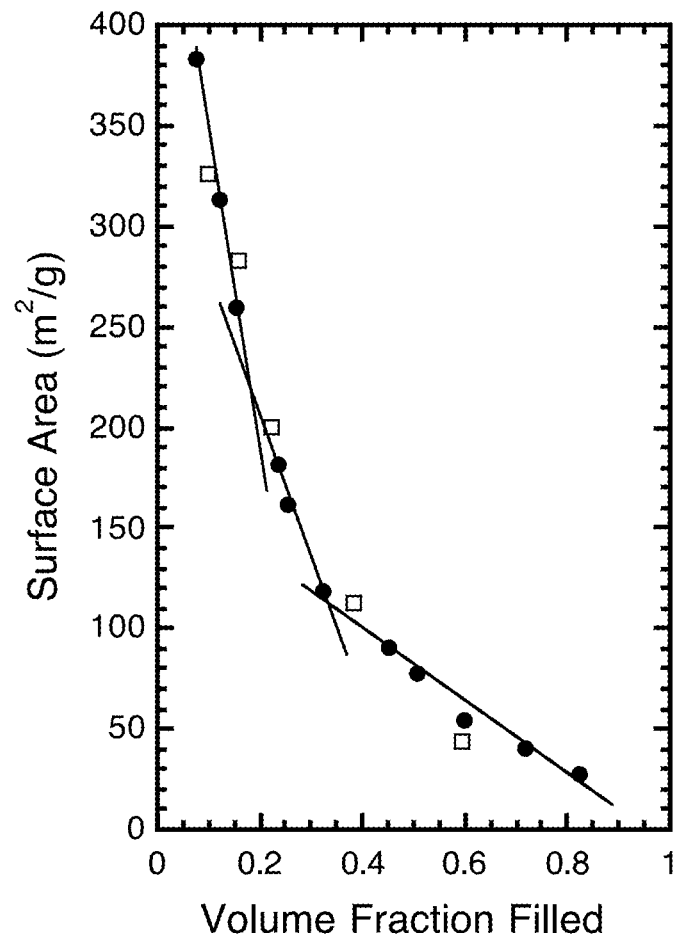
FIG. 17 shows the effect of support loading (% w/w) with HDEHP ($\square$) or PTHF 250 ($\bullet$) on the surface area of Amberchrom® CG-71m resin.
Figure 18A:
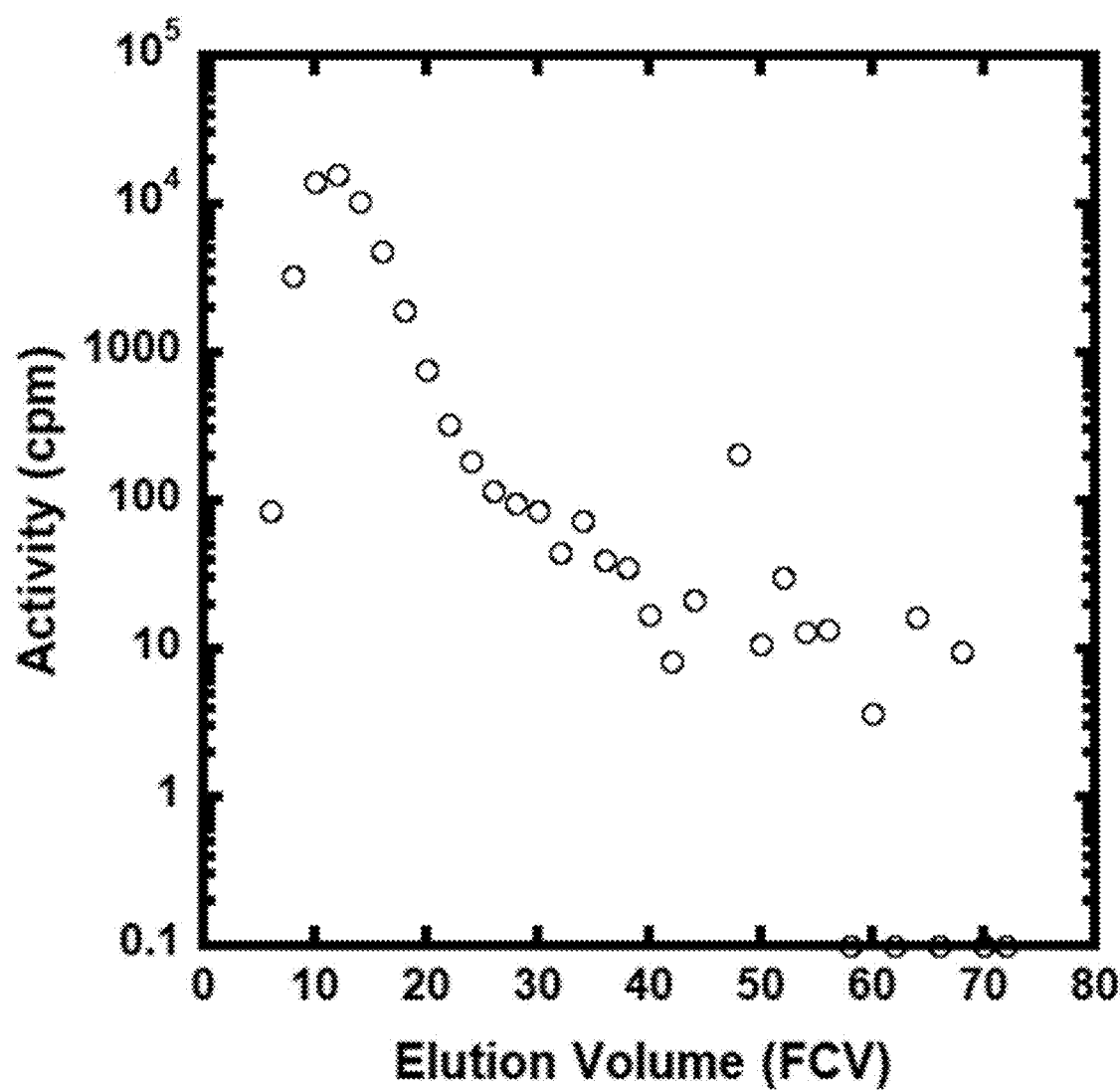
FIGS. 18A-18E show the elution behavior of Eu on packed columns of Amberchrom® CG-71m having 0.15 volume fraction filled with 1-dodecanol (stagnantly pore plugged or SPP) and impregnated with HDEHP in increasing amounts (w/w): 5% (FIG. 18A), 10% (FIG. 18B), 15% (FIG. 18C), 20% (FIG. 18D), and 30% (FIG. 18E).
Figure 18B:
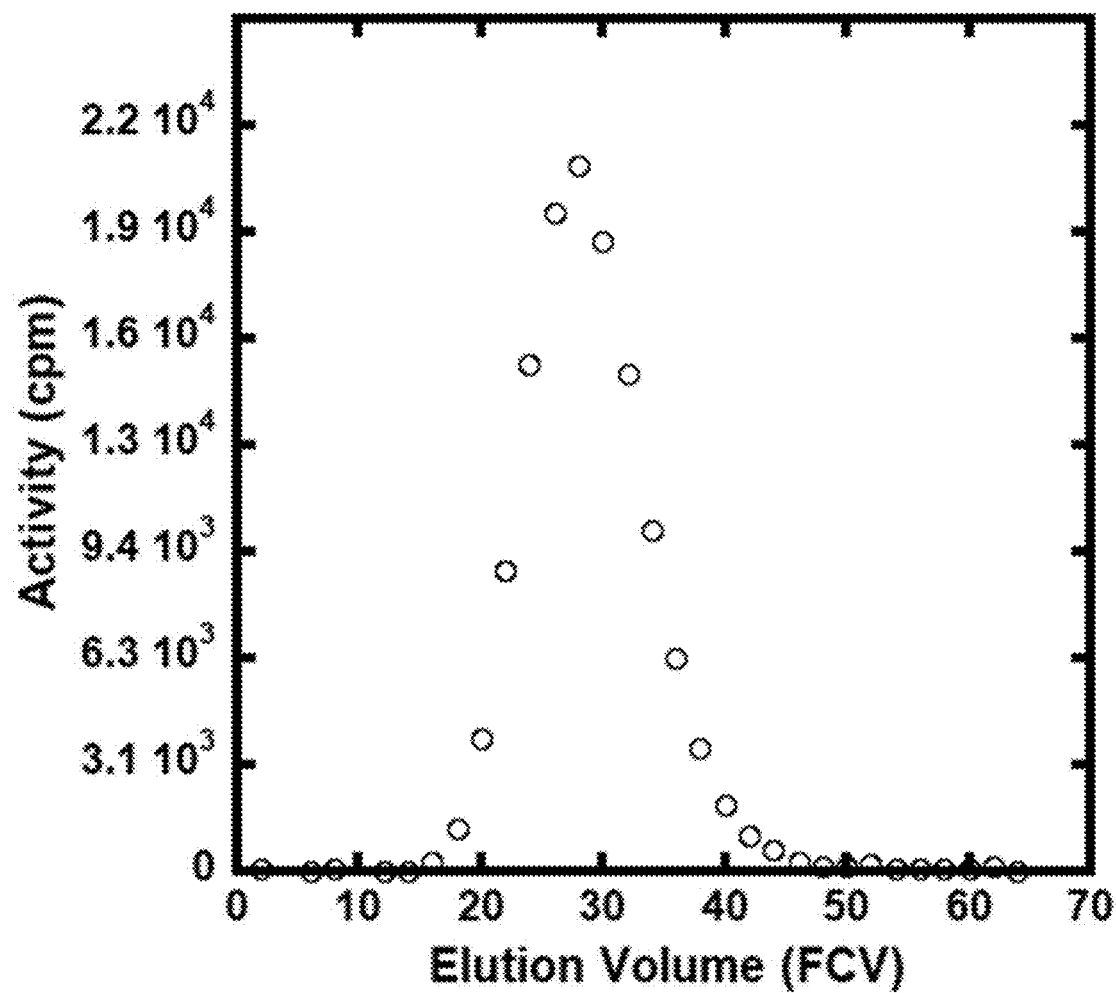
Figure 18C:
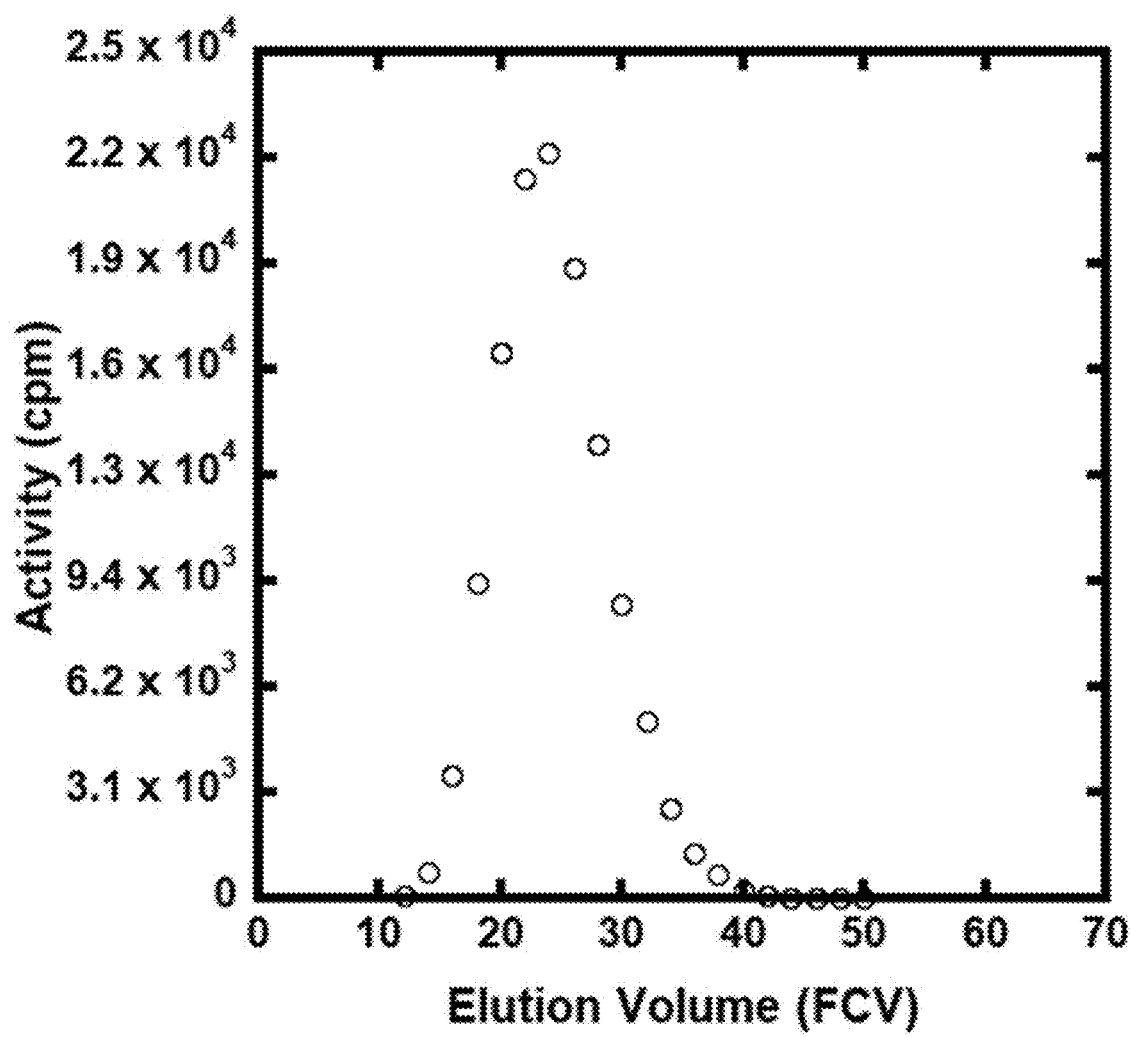
Figure 18D:
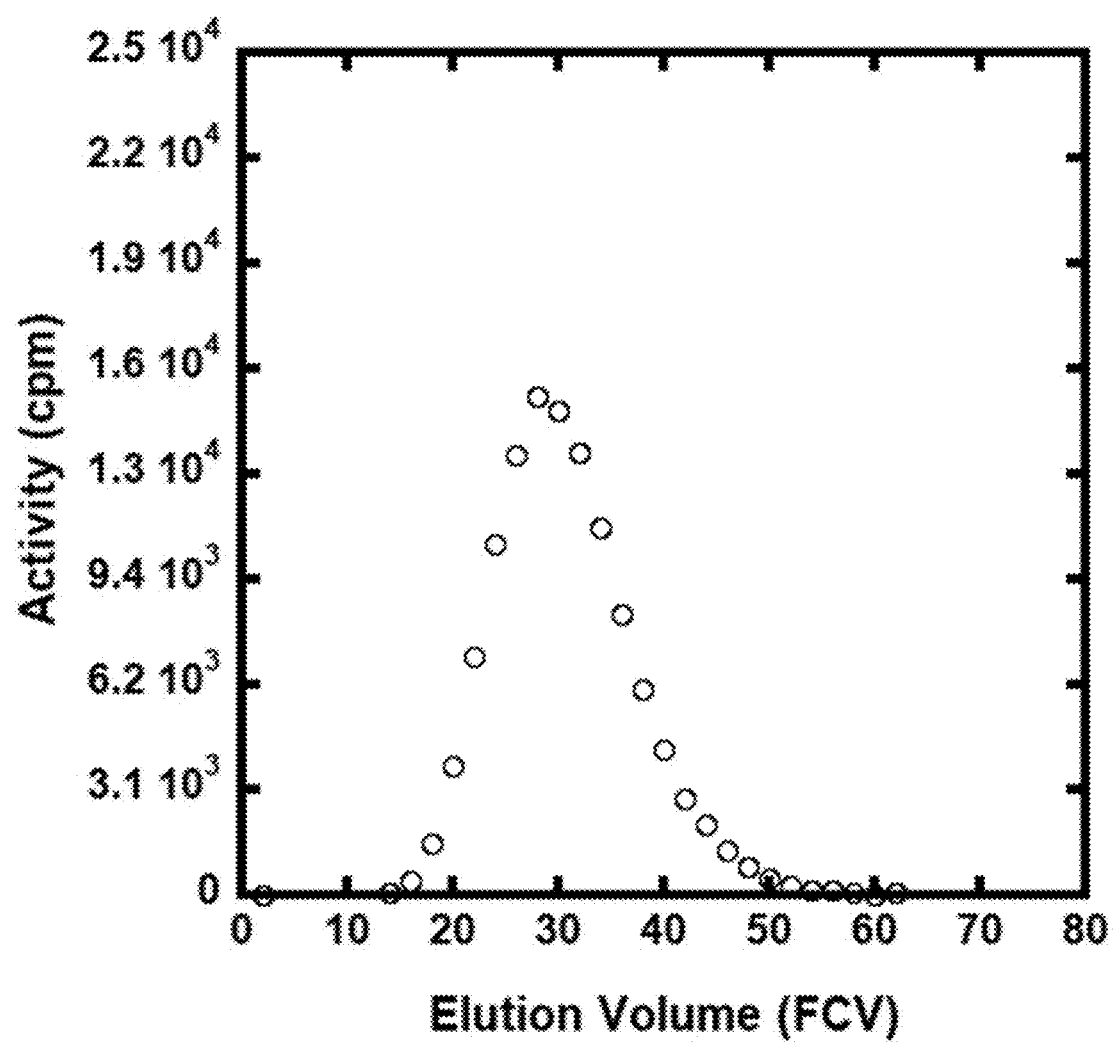
Figure 18E:
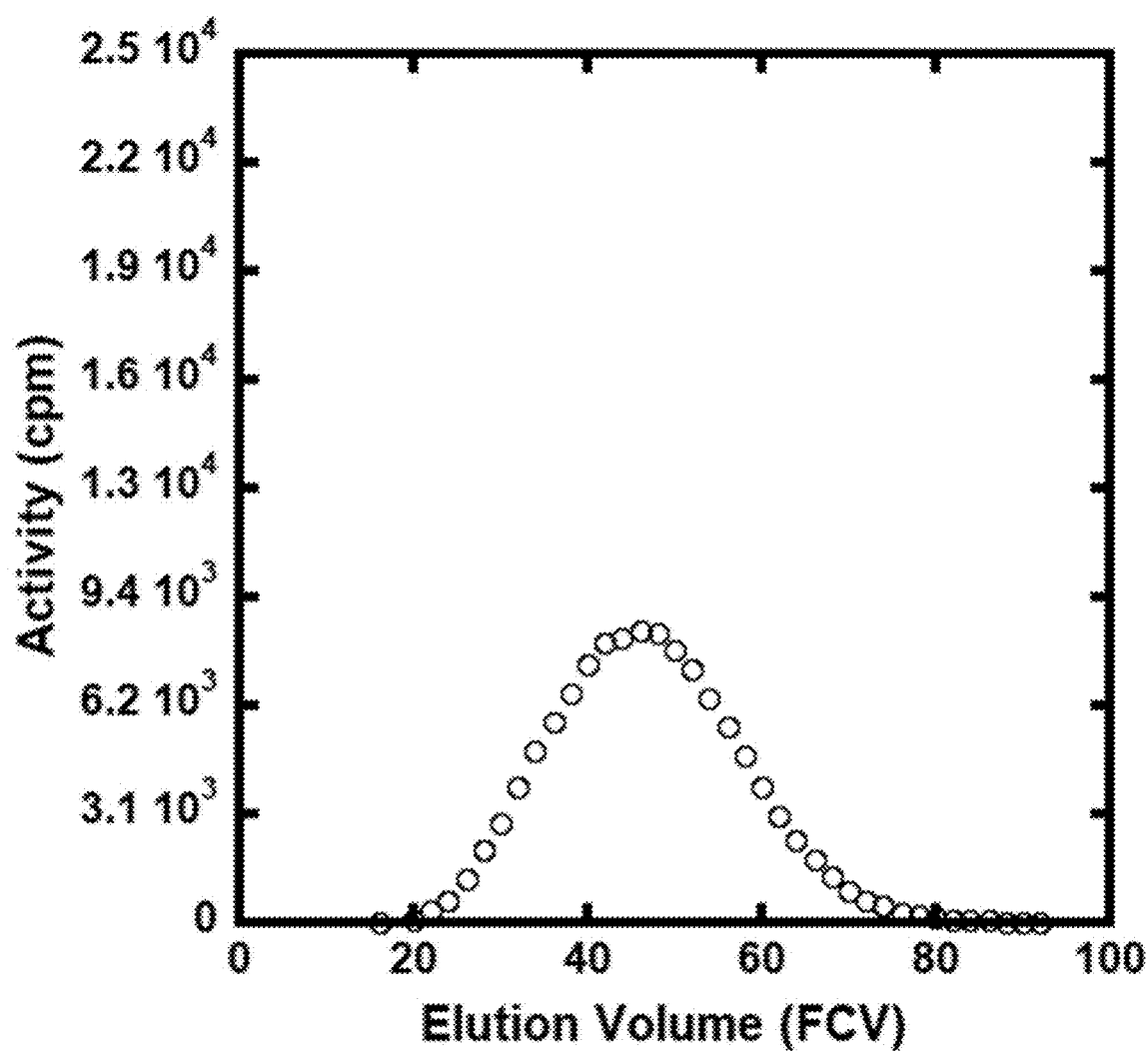

The question thus remains as to how much of the filler and HDEHP to use. Again, on the basis of surface area data, the 15% (w/w) support loading with HDEHP appears to nearly completely fill the smallest pores (FIG. 17). Moreover, the column efficiency of this same resin, as indicated by the plate counts (N) shown in TABLE 3 indicates that at this loading level a thin layer of extractant is not present in the mesopores, as is the case for the 20% (w/w)-loaded HDEHP resin. Taken together, these observations indicate that the empty support should be loaded with filler to the same volume filled by the 15% (w/w) HDEHP resin, and that HDEHP should be placed atop the filler at a yet to be determined thickness.

From the results described thus far, it is clear that a suitable filler can be an inert, water-immiscible yet compatible with a hydrophilic support, and relatively non-viscous. These requirements led us to revisit the use of aliphatic alcohols, this time those with a carbon chain shorter than that of cetyl alcohol ($C_{16}$). Our initial efforts focused on 1-dodecanol, which ultimately proved to be satisfactory. In particular, the surface area of a 1-dodecanol-impregnated support (299.65 m²/g) was found to be in good agreement with that observed for a support impregnated with HDEHP (282.91 m²/g) when both resins were loaded to the same volume fraction. Upon flushing the resin with water (40 mL or 40 bed volumes), no 1-dodecanol was detected in the column effluent by $^1$H-NMR analysis. Empty solid supports were then filled with 1-dodecanol to the same volume fraction as that occupied by the 15% (w/w) HDEHP, and atop this filler was loaded extractant (HDEHP) to levels ranging from 5 to 30% (w/w).

The characteristics used to assess the performance of these resins are shown in TABLE 4. These values are derived from the plots shown in FIGS. 18A-18E, which depict the elution behavior of Eu on packed columns of the materials. That the highest plate count is observed for the resin containing 10% (w/w) HDEHP is reasonable, given that the 10% (w/w) HDEHP SPP (i.e. 1-dodecanol loaded) resin occupies a volume fraction (~0.26) of the support similar to that observed for the 20% HDEHP resin (~0.22). Just as important is that the results suggest that no interactions between the 1-dodecanol filler and the HDEHP extractant are taking place. That is, if HDEHP did interact with the filler, the column efficiency, peak tailing, and peak asymmetry values would have been unsatisfactory due to the retention of metals ions in the deep, inaccessible pores of the support.

TABLE 4

Theoretical plate height (H) and count (N), tailing factor ($T_f$), and peak asymmetry ($A_s$), and capacity for HDEHP-stagnantly-pore plugged resins

| Resin ((% w/w) SPP HDEHP) | $T_f$ | $A_s$ | H | N | Capacity (mg Eu/mL bed) | Moles HDEHP consumed/ Moles HDEHP present*100 |
|---|---|---|---|---|---|---|
| 10 | 1.18 | 1.27 | 0.145 | 33 | 3.50 | 66.8 |
| 15 | 1.15 | 1.19 | 0.164 | 29 | 5.10 | 67.0 |
| 20 | 1.18 | 1.29 | 0.251 | 19 | 6.25 | 73.3 |
| 30 | 1.07 | 1.15 | 0.281 | 17 | 14.35 | 78.1 |
| 40 | — | — | — | — | — | 80.4 |

Experimental conditions: $V_{column}$ = 0.90 mL; $L_{column}$ = 4.77 cm; Flow rate: 1.39 ± 0.08 mL/cm² · min.

In considering results for resins loaded to other levels, it can be seen that for the 5% (w/w) HDEHP SPP resin (FIG. 18A), $^{152/4}Eu^{3+}$ elutes from the column almost immediately, but that complete elution is nonetheless protracted, as was the case for the 5% (w/w) pure HDEHP resin. Thus, no calculation of the performance metrics was attempted. As can also be seen, the 10% (w/w) HDEHP SPP resin is the most efficient and, thus, apparently an appropriately thin extractant layer in the intermediate pores.

The decrease in column efficiency with loading, noted here (TABLE 4), has been previously observed for other EXC sorbents. For example, Sochacka et al. noted an increase in plate height with increasing HDEHP loading with a diatomaceous earth support (Sochacka and Siekierski, 1964. *Journal of Chromatography*, 16, 376-384). Horwitz et al. observed the same effect with HDEHP-loaded Celite (Horwitz et al., 1969. *Journal of Inorganic and Nuclear Chemistry*, 31, 1149-1166). As the Celite was loaded with HDEHP, the authors noted, the smaller pores filled first, allowing a thin layer of extractant to coat the larger pores. Loading past intermediate levels, however, only increased the diffusion distance of the metal ion in the support, resulting in decreased column efficiency. The trend in column efficiency shown in TABLE 4 is consistent with the explanation posed by Horwitz et al. That is, the 1-dodecanol occupies the smallest and least accessible pores in the support, thereby allowing the HDEHP to be present at different layer thicknesses in the larger pores.

Besides improved column efficiency, plugging of small pores by addition of the 1-dodecanol to the various resins leads to a near-constant value of the tailing (1.1-1.2) and peak asymmetry (1.15-1.30) factors, regardless of the support filling level. The support micropores, therefore, appears to be the source of peak tailing in this support.

Unexpectedly, the observed improvements in column efficiency and peak tailing were also accompanied by higher metal ion uptake. As can be seen in TABLE 4, the capacity of the 10-20% (w/w) HDEHP SPP resins is about double that of their pure HDEHP analogues. More interesting is that the capacity of the 30% (w/w) HDEHP SPP resin actually exceeds that of the commercial Ln resin which is loaded to a higher level. Also notable from TABLE 4 are data for fraction of available extractant consumed for the SPP resins. As shown, the SPP resins allow for ~70-80% of the available extractant to be used. In contrast, the HDEHP-only resin can exhibit as little as ~30% capacity utilization, as illustrated by the 10% (% w/w) HDEHP resin. In published literature, HDEHP is frequently described as existing as a dimer in solution. If this were the case here, however, for the prepared SPP resins, the capacity would be more than stoichiometrically possible. A possible explanation is that the HDEHP is present in monomeric form. Apparently then, micropore filling allows for improvements not only in tailing but in resin capacity as well.

Example 4

Figure 19:
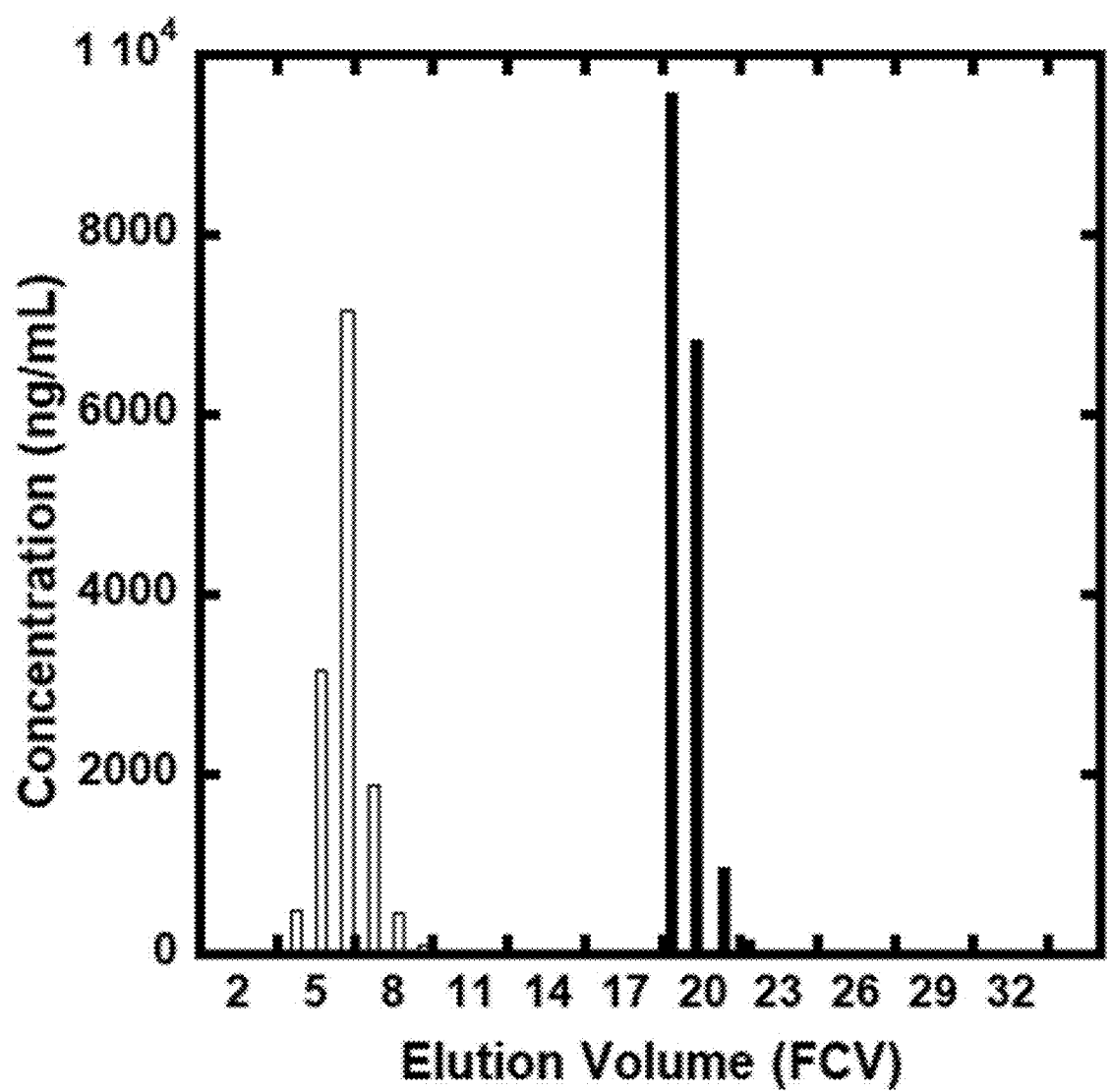
FIG. 19 shows 10% (% w/w) SPP HDEHP resin separation of $Eu^{3+}$ (Filled)/$Nd^{3+}$ (Open), 0.9 mL bed volume (Temperature: 23±2° C., eluents: 0.045 M $HNO_3$ followed by 1 M $HNO_3$ at FCV=17).
Figure 20:
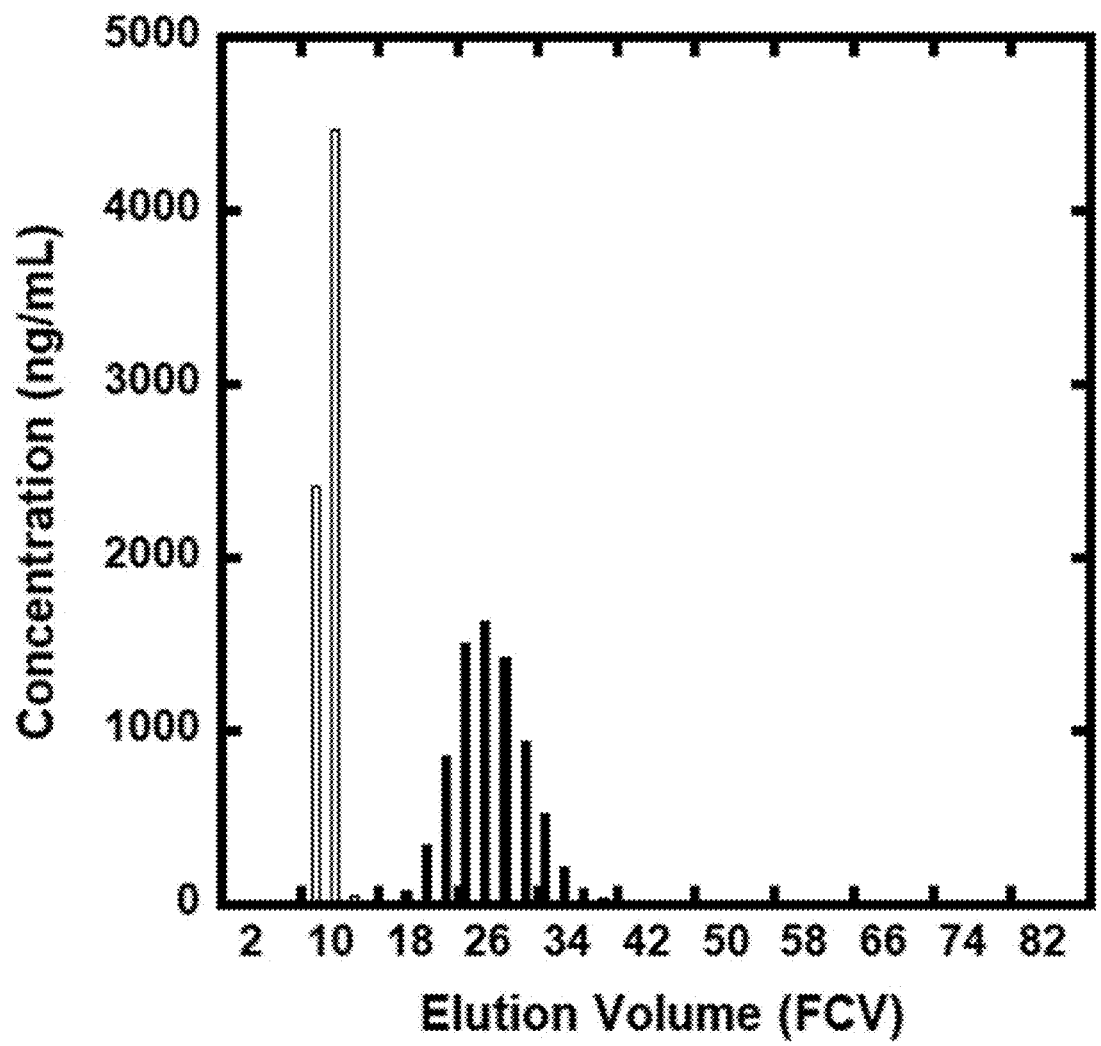
FIG. 20 shows separation of $Eu^{3+}$ (Filled)/$Nd^{3+}$ (Open) on EiChrom Technologies' commercial Ln resin (HDEHP impregnated onto an inert polymeric support): 0.9 mL bed volume (Temperature: 23±2° C., eluents: 0.3 M $HNO_3$).

Applications in Intra-Lanthanide Metal Ion Separations $Eu^{3+}/Nd^{3+}$ Separation. The data shown in TABLE 4 show the potential of the SPP resins. Given the reported difficulty in separating trivalent europium from neodymium, the separation of these two metal ions was the first attempted (Payne et al., 2011. *Journal of Radioanalytical and Nuclear Chemistry*, 287, 863-867). It is clear from the $D_w$ values for Eu and Nd and the corresponding separation factors (SFs), that a separation of the two metal ions should be possible with either the 10% (% w/w) HDEHP SPP resin or conventional Ln resin. While distribution ratio data allow one to predict where a metal ion will elute on a given column, it does not prove that complete separation will occur. Thus, the two metal ions were applied to both 10% (% w/w) HDEHP SPP and Ln resin columns and their elution behavior determined. As shown in FIGS. 19 and 20, complete resolution is achieved with both the 10% HDEHP SPP and the Ln resin. The ability of the latter to resolve the two metal ions was certainly unexpected given the published results (Bertelsen et al., 2019. *Journal of Chromatography A*, 1595, 248-256; Payne et al., 2011. *Journal of Radioanalytical and Nuclear Chemistry*, 287, 863-867).

$Eu^{3+}/Gd^{3+}$ Separation. Metal ions directly adjacent to one another in the periodic table are among the most difficult to separate. The separation of americium and curium is a well-known example of such a problem, which is especially evident with commercial resins (Gharibyan et al., 2014. *Solvent Extraction and Ion Exchange*, 32, 391-407; Kurosaki and Clark 2011. *Radiochimica Acta*, 99, 65-69; Suzuki et al., 2007. *Journal of Radioanalytical and Nuclear Chemistry*, 272, 257-262; Kraak and Van Der Heij den, 1966. *Journal of Inorganic and Nuclear Chemistry*, 28, 221-234). Therefore, the separation of europium and gadolinium was attempted, as these metal ions are directly above americium and curium, respectively, in the periodic table and been cited as difficult to separate in numerous published works (Payne et al., 2011. *Journal of Radioanalytical and Nuclear Chemistry*, 287, 863-867; Kondo et al., 2013. *Chemical Engineering Transactions*, 32, 919-924; Li et al., 2018. *Hydrometallurgy*, 178, 181-187). As before, a comparison of $D_{Eu}$, $D_{Gd}$, and SF data of both the 10% HDEHP SPP and Ln resins was done first. The Ln resin was found to extract $Eu^{3+}$ and $Gd^{3+}$ equally well at both 0.25 M ($D_{w,Eu}$=163; $D_{w,Gd}$=158) and 0.30 M $HNO_3$ ($D_{w,Eu}$=90; $D_{w,Gd}$=83). While the SFs improve at 0.15 M ($D_{w,Eu}$=610; $D_{w,Gd}$=1144) and 0.20 M $HNO_3$ ($D_{w,Eu}$=195; $D_{w,Gd}$=352), both metal ions are strongly retained, making their separation difficult. At 0.40 M $HNO_3$ ($D_{w,Eu}$=20; $D_{w,Gd}$=37), conversely, the metals ions are not held strongly enough, and both would be eluted from the column almost unretained.

Contrary to the Ln resin, a separation between the two metal ions seems possible for the 10% (% w/w) HDEHP SPP resin. Between 0.025 M $HNO_3$ ($D_{w,Eu}$=823; $D_{w,Gd}$=1280) and 0.05 M $HNO_3$ ($D_{w,Eu}$=76; $D_{w,Gd}$=117), the metals ions are not too strongly retained for baseline resolution to occur. Furthermore, the SFs (1.56 and 1.54 for 0.025 M and 0.05 M $HNO_3$, respectively) at the same acidities indicate a separation should occur. The remaining acidities (0.075-0.15 M $HNO_3$) show the column would not retain the metal ions strongly enough ($D_w$<40), and each would be eluted almost unretained.

Figure 21:
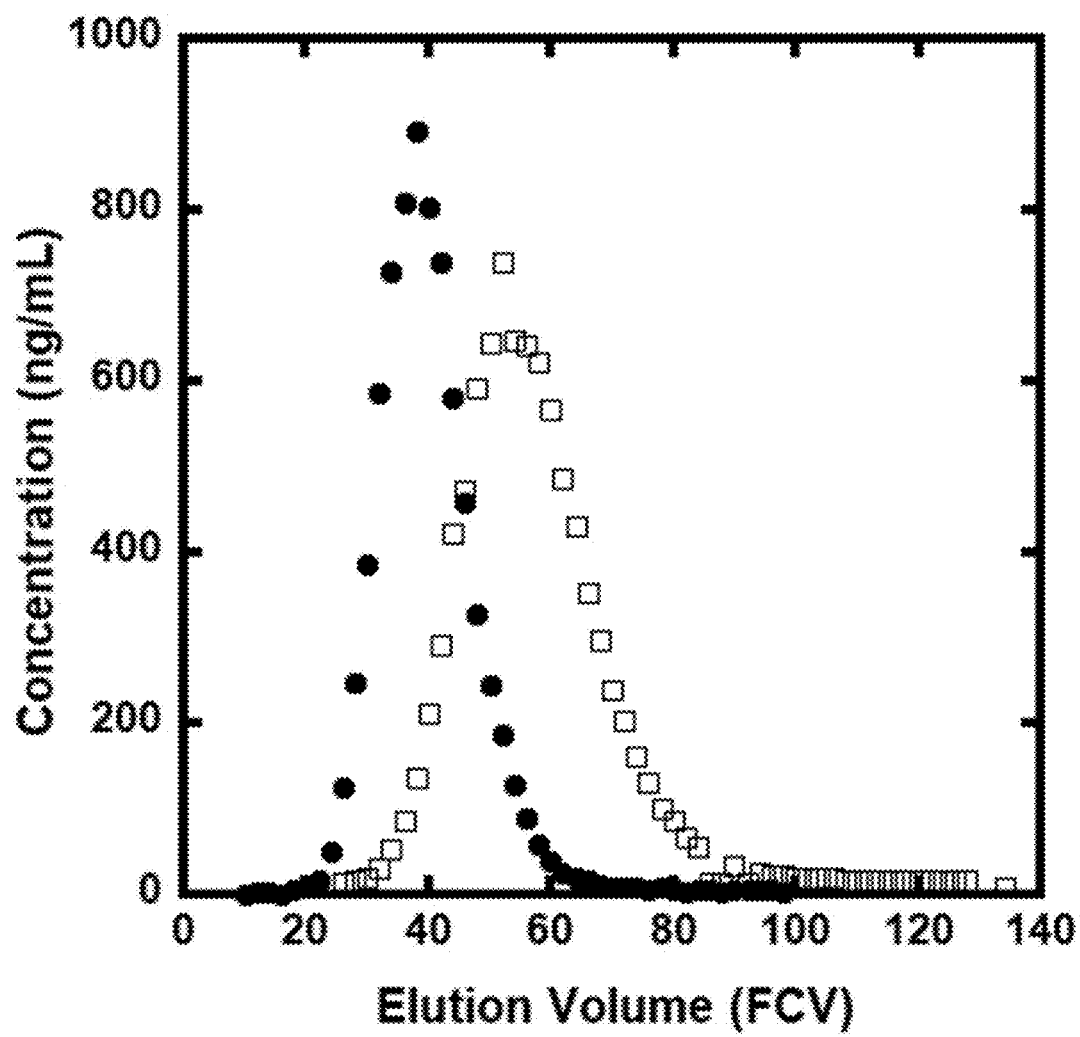
FIG. 21 shows 10% (% w/w) SPP HDEHP separation of $Eu^{3+}$ ($\bullet$)/$Gd^{3+}$ ($\square$), 0.9 mL bed volume (Temperature: 23±2° C., eluent: 0.045 M $HNO_3$).
Figure 22:
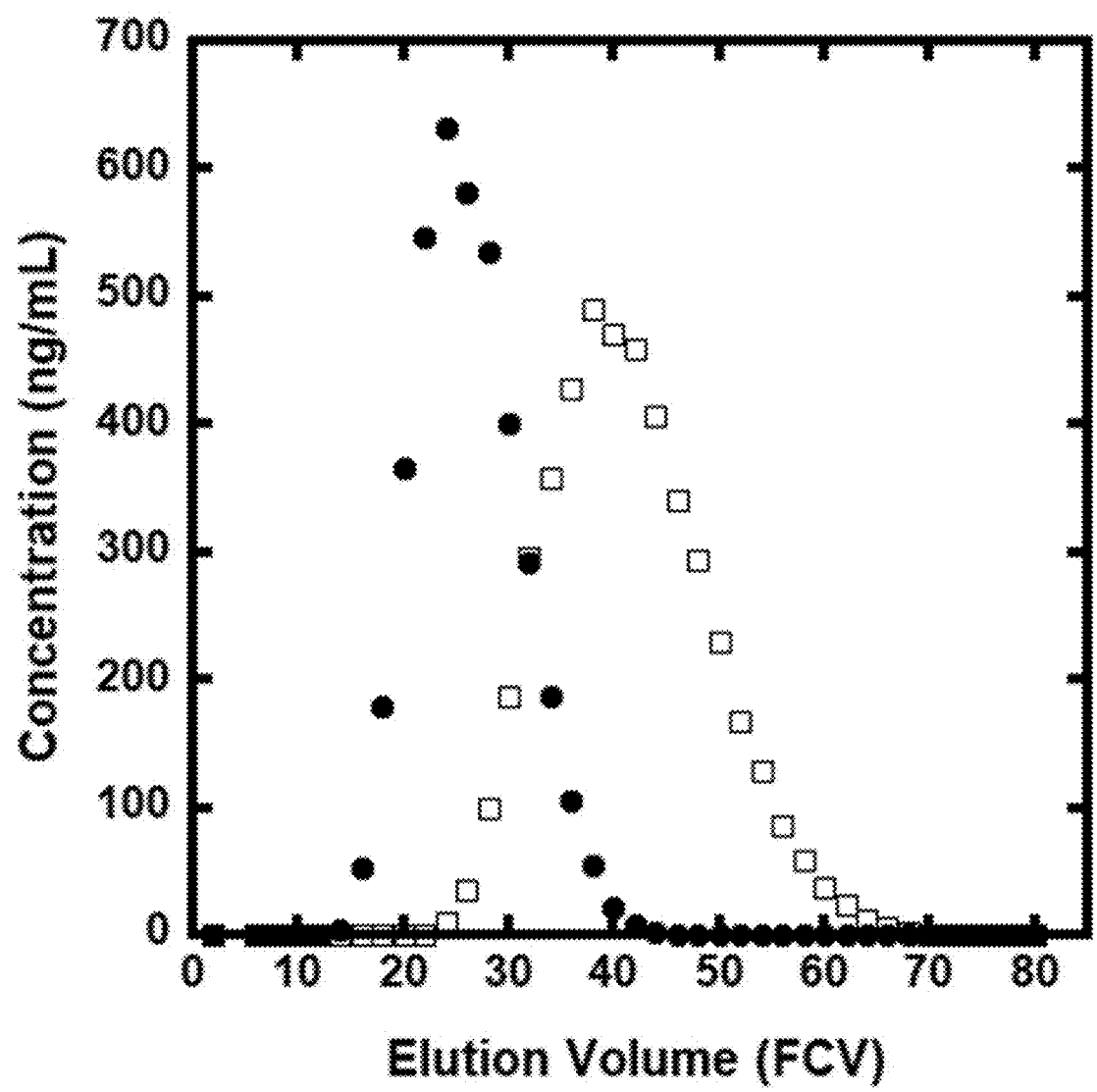
FIG. 22 shows separation of $Eu^{3+}$ ($\bullet$)/$Gd^{3+}$ ($\square$) on EiChrom Technologies' commercial Ln resin: 0.9 mL bed volume (Temperature: 23±2° C., eluent: 0.3 M $HNO_3$).

Elution profiles for the two resins are shown in FIGS. 21 and 22. Resolution values of 0.42 and 0.53 are observed for the 10% (% w/w) HDEHP SPP and Ln resins, respectively. The poor resolution by the SPP column indicates that simply applying a thin layer of extractant to a porous resin is not enough to completely separate the two metal ions.

According to the van Deemter Equation (Eq. 1), decreasing the resin particle size should decrease the theoretical plate height by lowering the A and C terms, as the column bed should be more uniformly packed and the metal ion will spend less time diffusing through the mobile phase and more time interacting with the stationary phase. Horwitz et al. discussed improvements in strontium ion separations by simply decreasing the particle size of the support material (Horwitz et al., 1992. *Solvent Extraction and Ion Exchange*, 10, 313-336). In eluting $^{85}Sr$ using a resin impregnated with 1.0 M 4, 4'(5')-bis(t-butylcyclohexano)-18-crown-6 in 1-octanol solution, the 100-125 μm resin displayed a theoretical plate height of 0.53 cm, while that of the 50-100 μm resin was 0.11 cm (Li et al., 2018. *Hydrometallurgy*, 178, 181-187). Besides lowering the resin particle size, simply lengthening the column will increase the number of theoretical plates.

Figure 23:
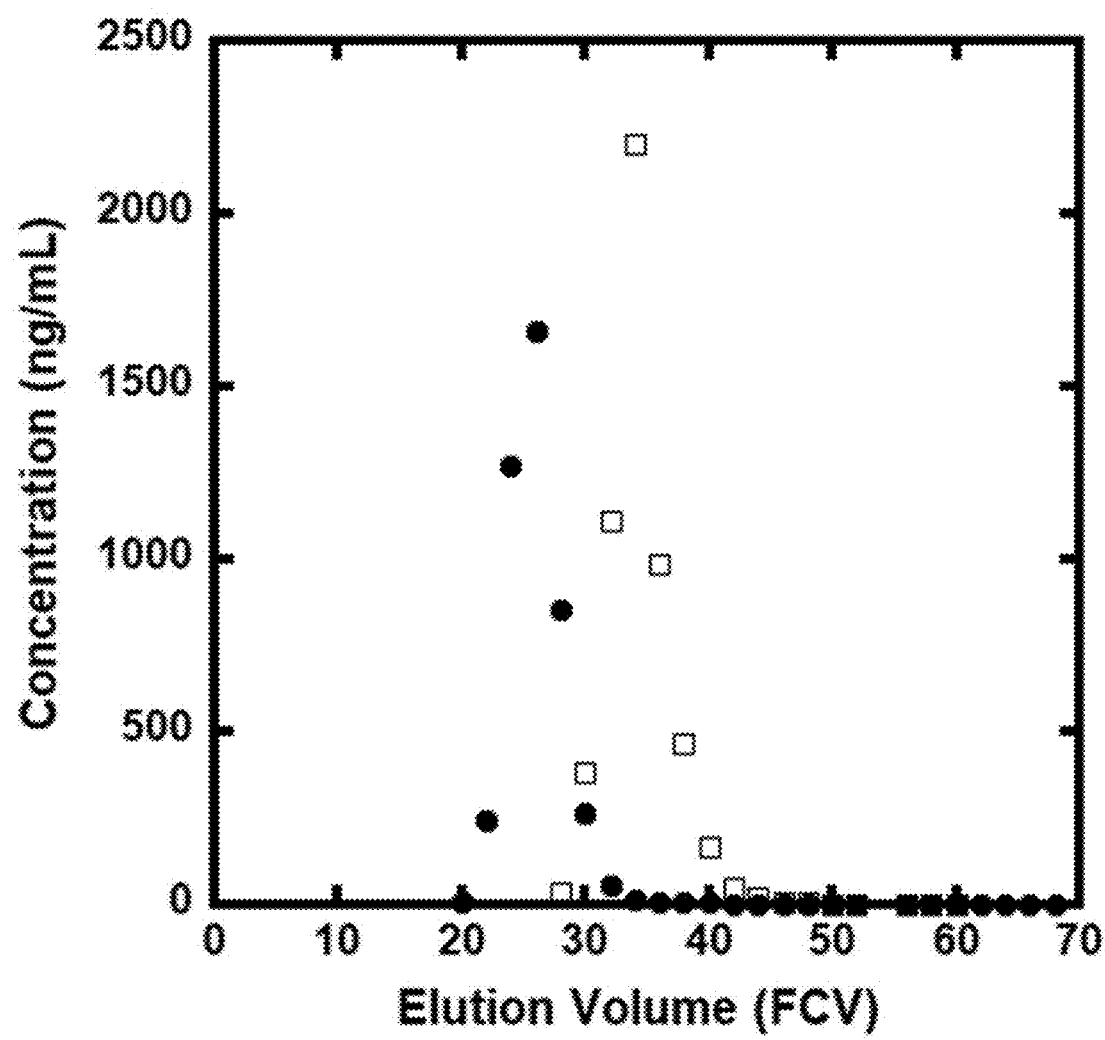
FIG. 23 shows small particle (20-50 μm particle size) 10% (% w/w) SPP HDEHP separation of $Eu^{3+}$ ($\bullet$)/$Gd^{3+}$ ($\square$) with column length increased from 5 cm to 10 cm: 1.8 mL bed (Temperature: 23±2° C., eluent: 0.045 M $HNO_3$).
Figure 24:
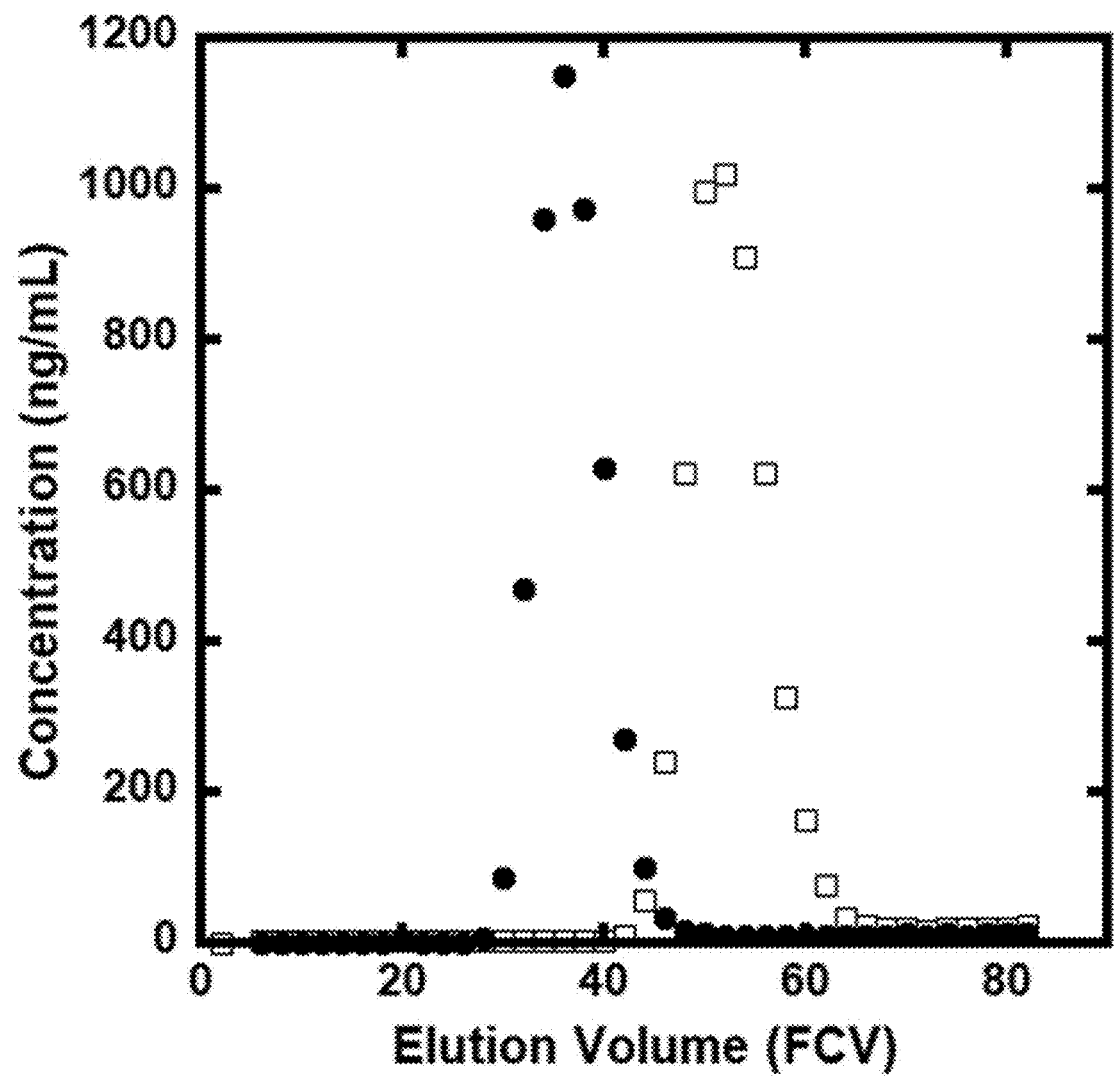
FIG. 24 shows small particle Ln resin separation of $Eu^{3+}$ ($\bullet$)/$Gd^{3+}$ ($\square$) with column length increased from 5 cm to 10 cm: 1.8 mL bed (Temperature: 23±2° C., eluents: 0.3 M $HNO_3$).

Identical 10% (w/w) HDEHP SPP beads were then prepared as previously described but the pre-filter material (20-50 μm particle size) was used instead of the Amberchrom CG-71m (50-100 μm particle size). In addition, the column length was increased from 5 to 10 cm. Similarly, a small particle analogue of the commercial resin was prepared by impregnating the pre-filter material with 40% (w/w) HDEHP. The $Eu^{3+}/Gd^{3+}$ elution profiles for the two resins are shown in FIGS. 23 and 24. By decreasing the particle size of the 10% (% w/w) HDEHP SPP resin and lengthening the column, the resolution was improved to 0.79 (vs. 0.42 for a 0.9 mL bed of 50-100 μm particle size resin). Decreasing the particle size and lengthening the column also gave an improved $Eu^{3+}/Gd^{3+}$ separation for the Ln resin, as the resolution improved from 0.53 to 1.09. As the small-particle 10% (% w/w) HDEHP SPP resin had a thinner layer of extractant compared that of the small-particle Ln resin, it should have given a more resolved chromatogram. Previous work by these authors, however, has shown that by simply decreasing the particle size of the Ln resin, comparable improvement in resolution (0.92) is observed compared to a decreased loading level (0.89 of the 20% (w/w) HDEHP). Under these conditions then, column efficiency must be more strongly controlled by column height and particle size than stationary phase thickness.

The results of the present studies demonstrate the advantages of a stagnant-pore plugged (SPP) supports, as it provides improvements in column efficiency, peak tailing, and column capacity. While other methods used in metal ion separations involve more complicated resin preparation, these materials are easily prepared with only a balance and rotary evaporator, available in almost all chemistry laboratories. An ideal filler, as has been shown, must be water-immiscible, support compatible, and inert to the support and extractant, properties that solvents other than 1-dodecanol undoubtedly have.

The foregoing description of the specific aspects will so fully reveal the general nature of the invention that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. An extraction chromatographic (EXC) support comprising:
   (a) a porous support comprising pores; the pores comprising small pores (<4 nm), intermediate pores (4-20 nm), and large pores (>20 nm);
   (b) an inert filler of the porous polymer support; and
   (c) a metal ion binding extractant;
   wherein the small pores are impregnated with the filler and the intermediate and/or large pores are impregnated with the metal ion binding extractant.

2. The EXC support of claim 1, wherein the porous support is a porous polymer support.

3. The EXC support of claim 2, wherein the porous polymer support is a polyester support.

4. The EXC support of claim 3, wherein the polyester support is an aliphatic (acrylic ester) polymer resin.

5. The EXC support of claim 1, wherein the filler is a $C_{11-16}$alkyl alcohol, a low molecular weight polymer, or an ionic liquid.

6. The EXC support of claim 5, wherein the low molecular weight polymer is polypropylene glycol 400 (PPG400) or polytetrahydrofuran.

7. The EXC support of claim 5, wherein the ionic liquid is a water-immiscible ionic liquid.

8. The EXC support of claim 5, wherein the filler is 1-dodecanol, $C_{12}mim^+Tf_2N^-$, $C_{16}mim^+f_2N^-$, $C_{12}mim^+BF_4^-$, trihexyltetradecylphosphonium bis(trifluoromethanesulfonyl)imide $(P_{66614}{}^+Tf_2N^-)^-$, trihexyltetradecylphosphonium tetrafluoroborate $(P_{66614}{}^+BF_4^-)$, dimethylammonium dimethyl carbamate, or N,N-dimethylethanolammonium formate.

9. The EXC support of claim 1, wherein the filler occupies from 0.075 to 0.82 volume fraction of the pores.

10. The EXC support of claim 9, wherein the filler occupies 0.15 volume fraction of the pores.

11. The EXC support of claim 1, wherein the metal ion binding extractant is a lanthanide and/or actinide ion binding extractant.

12. The EXC support of claim 11, wherein the extractant is a crown ether, a dialkyl phosphoric, phosphonic, or phosphinic acid, trialkylphosphate, trialkylphosphine oxide (TRPO), glycolamide, malonamide, or monoamide.

13. The EXC support of claim 11, wherein the extractant is di-tert-butylcyclohexano-18-crown-6, bis(2-ethylhexyl) phosphoric acid) (HDEHP), diisodecylphosphoric acid (DIDPA), 2- ethylhexylphosphonic acid mono-2-ethylhexyl ester (HEH- [EHP]), dipentyl pentylphosphonate, octyl(phenyl)-N,N-diisobutylcarbamoylmethylphosphine oxide (CMPO), tri-n-butyl phosphate (TBP), trialkyl phosphine oxide (TRPO), N,N,N',N'-tetra-n-octyldiglycolamide (TODGA), N,N'-dimethyl-N,N'-dibutyl tetradecylmalonamide (DMDBTDMA), N,N'-dimethyl-N,N'-dioctyl-2-(2-hexyloxy-ethyl)-malonamide (DMDOHEMA), N,N,N',N'-tetrakis-2-ethylhexyldiglycolamide (TEHDGA), di-2-ethylhexyl butyramide(D2EHBA), di-2-ethyhexyl-isobutryamide (D2EHiBA), di-2-ethyhexyl acetylamide (D2EHAA), or N,N'-dimethyl-N,N'-dioctyl-3-oxa-diglycolamide (DMDODGA).

14. The EXC support of claim 1, wherein the EXC support is impregnated with the extractant in an amount of 5-30 weight % of the weight of the porous support impregnated with the filler.

15. The EXC support of claim 14, wherein the EXC support is impregnated with the extractant in an amount of 10 weight % of the weight of the porous support impregnated with the filler.

16. A method of preparing the EXC support of claim 1 comprising:
   (i) combining the porous support with the pore filler in a first volatile carrier solvent;
   (ii) applying heat and vacuum to remove the first volatile carrier solvent and provide a porous support impregnated with the pore filler;
   (iii) adding the extractant in a second volatile carrier solvent to the pore filler-impregnated porous support; and
   (iv) applying heat and vacuum to remove the second volatile carrier solvent.

17. A method of preparing the EXC support of claim 1 comprising
   (i) combining the porous support with the pore filler in a first volatile carrier solvent, the pore filler being used in an amount sufficient to file the pores substantially to capacity;
   (ii) applying heat and vacuum to remove the first volatile carrier solvent to provide a porous support loaded with the pore filler;
   (iii) contacting the pore filler-loaded porous support with a solvent to remove an outer layer of the pore filler from the pore filler-loaded porous support;
   (iv) adding the extractant in a second volatile carrier solvent to the pore filler-loaded porous support with outer layer removed; and
   (v) applying heat and vacuum to remove the second volatile carrier solvent.

18. A method of separating metal ions comprising:
   (1) contacting a solution comprising two or more different metal ions with the EXC support of claim 1 loaded in a chromatographic column;
   (2) eluting the metal ion-containing solution through the chromatographic column; and
   (3) separating the two or more different metal ions.

19. The method of claim 18, wherein the two or more different metal ions are selected from lanthanide, actinide ions, and alkaline earth ions.

20. The method of claim 19, wherein the alkaline earth ions are selected from Sr, Ca, Ba, and Ra; and
   the lanthanide or actinide ions are selected from La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, and Lr.

* * * * *